(12) United States Patent
Yoon

(10) Patent No.: US 11,994,735 B2
(45) Date of Patent: May 28, 2024

(54) CAMERA LENS ASSEMBLY HAVING LINEAR GUIDE

(71) Applicant: SAMYANG OPTICS CO., LTD, Changwon-si (KR)

(72) Inventor: Soo Won Yoon, Changwon-si (KR)

(73) Assignee: SAMYANG OPTICS CO., LTD, Changwon-si (KR)

( * ) Notice: Subject to any disclaimer, the term of this patent is extended or adjusted under 35 U.S.C. 154(b) by 877 days.

(21) Appl. No.: 17/088,029

(22) Filed: Nov. 3, 2020

(65) Prior Publication Data

US 2022/0137316 A1 May 5, 2022

(51) Int. Cl.
*G02B 7/02* (2021.01)

(52) U.S. Cl.
CPC .................................... *G02B 7/021* (2013.01)

(58) Field of Classification Search
CPC . G02B 7/102; G02B 7/10; G02B 7/04; G02B 7/021; G02B 7/08; G02B 7/023; G02B 7/022; G02B 7/026; G03B 17/04
See application file for complete search history.

(56) References Cited

U.S. PATENT DOCUMENTS

| 6,222,684 | B1* | 4/2001 | Nishimura | G03B 9/14 359/740 |
| 10,241,291 | B2 | 3/2019 | Kamo | |
| 2007/0217783 | A1* | 9/2007 | Nishijima | G03B 17/04 396/448 |
| 2009/0185285 | A1* | 7/2009 | Abe | G03B 3/10 359/694 |
| 2021/0223502 | A1* | 7/2021 | Konishi | G02B 7/021 |

\* cited by examiner

*Primary Examiner* — Ephrem Z Mebrahtu
(74) *Attorney, Agent, or Firm* — Studebaker & Brackett PC

(57) ABSTRACT

A camera lens assembly includes a lens holder for accommodating at least one lens, a pin protruding from the lens holder in a radial direction of the at least one lens, a ring member with which the pin is engaged, the ring member having a cam groove formed in a spiral direction to have a predetermined pitch along an optical axis and being rotatable about the optical axis according to a user's operation, and a guide device for guiding the lens holder to move only in a direction parallel to the optical axis. In particular, when the ring member rotates, the lens holder on which the pin is formed moves in the direction parallel to the optical axis within the pitch under the guide of the guide device.

19 Claims, 27 Drawing Sheets

100

120

120

180

150

145

CAMERA LENS ASSEMBLY HAVING LINEAR GUIDE

BACKGROUND

1. Technical Field

The present invention relates to a camera lens assembly having a linear guide, and more specifically, to a camera lens assembly capable of precisely adjusting a movement of a lens in an optical axis direction according to operation of a manual ring.

2. Description of the Related Art

Generally, a manual ring of a camera lens is used for manual focus or optical magnification adjustment. When a user rotates the manual ring, at least some of a plurality of lenses are moved in an optical axis direction by a mechanical mechanism, thereby changing optical properties.

According to such a conventional camera lens assembly having a manual ring, a groove is formed in the manual ring in a spiral direction, and a first pin protruding from a lens holder is engaged with the groove. Accordingly, as the manual ring rotates, the first pin moves along the groove, and the movement of the first pin causes a travel of the lens holder.

In order to prevent rotation of the lens holder due to the movement of the first pin, it has a structure such that a fixed housing is provided with a groove parallel to the optical axis direction separately from the groove in the spiral direction, and a second pin is engaged therewith. Therefore, the lens holder is induced to have only a travel in the optical axis direction by the rotation of the lens holder.

However, according to the prior art, it is difficult to form a large rotation angle of the manual ring (e.g., 3000 or more) as a plurality of pins are engaged in the groove. On the contrary, if one wants to control the movement of the lens holder by one pin per groove and to increase the rotation angle of the manual ring, there is also a problem that it is difficult for the user to operate the manual ring smoothly with a small force.

SUMMARY

Aspects of the present invention provide a camera lens assembly that allows a user to easily operate a manual ring with a small force even in a configuration of a single pin coupled to a spiral groove formed on the manual ring.

Aspects of the present invention also provide a camera lens assembly capable of securing a circumferential angle formed by the spiral groove as large as possible.

However, aspects of the present invention are not restricted to those set forth herein. The above and other aspects of the present invention will become more apparent to one of ordinary skill in the art to which the present invention pertains by referencing the detailed description of the present invention given below.

According to an aspect of an exemplary embodiment, there is provided a camera lens assembly, comprising: a lens holder for accommodating at least one lens; a pin protruding from the lens holder in a radial direction of the at least one lens; a ring member with which the pin is engaged, the ring member having a cam groove formed in a spiral direction to have a predetermined pitch along an optical axis and being rotatable about the optical axis according to a user's operation; and a guide device for guiding the lens holder to move only in a direction parallel to the optical axis, wherein when the ring member rotates, the lens holder on which the pin is formed moves in the direction parallel to the optical axis within the pitch under the guide of the guide device.

The assembly may further comprise a housing for accommodating the lens holder and in which the guide device is installed, wherein the ring member is rotatably coupled to an outer diameter of the housing.

The guide device may comprise a guide rail fastened to one side of the housing, and a carriage block slidably coupled with the guide rail to move in the direction parallel to the optical axis, wherein the lens holder is fastened to the carriage block and moves along with the carriage block in a direction parallel to the optical axis.

The guide rail may be fastened to the housing by a bolt installed radial-outward, and wherein the carriage block is fastened to the lens holder by other bolt installed radial-outward.

The carriage block may comprise a recess extending along a longitudinal direction of the guide rail, wherein the guide rail comprises a guide that extends along the longitudinal direction of the guide rail and is engaged with the recess in the direction parallel to the optical axis, and wherein the carriage block is slidably coupled to the guide rail by the engagement between the recess and the guide.

The housing may comprise an opening through which the pin passes through the housing in the radial direction and is coupled to the cam groove of the ring member.

An angle at which the cam groove may be formed in a circumferential direction of the ring member is greater than 180°, preferably 3000 or more.

The assembly may further comprise a pin block fixed to one side of the lens holder, the pin block comprising the protruding pin and a body portion on which the protruding pin is installed and fastened to a mounting pocket of the lens holder.

The pin may comprise a roller capable of rotating within the cam groove due to friction with the cam groove; and a bolt for fixing the roller to the pin block, and wherein the roller is rotatable with respect to the bolt about an axis of the bolt.

The bolt radial-inward may fasten the body portion to the mounting pocket.

The pin may comprise a first pin and a second pin, the body portion may comprise a first body portion on which the first pin is installed and a second body portion on which the second pin is installed, and the first body portion and the second body portion may be connected by a spring in the direction parallel to the optical axis, such that an interval between the first pin and the second pin is variable under a bias.

The lens holder may comprise a first lens holder and a second lens holder, wherein the pin comprises a first pin and a second pin, wherein the cam groove comprises a first cam groove and a second cam groove, and the carriage block comprises a first carriage block and a second carriage block, and wherein the first pin is installed on the first lens holder and engaged with the first cam groove, and the second pin is installed on the second lens holder and engaged with the second cam groove.

The first cam groove and the second cam groove may have different pitches, such that when the ring member rotates by the user's operation, a distance between the first lens installed on the first lens holder and the second lens installed on the second lens holder varies.

Each of the first cam groove and the second cam groove may comprise two cam grooves parallel to each other.

The at least one lens may comprise a third lens fixed to the housing, together with the movable first lens and the movable second lens, wherein the third lens is a lens closer to an image-side than the first and second lenses.

The first pin block installed on the first lens holder and the second pin block installed on the second lens holder may be positioned to be symmetrical in the circumferential direction based on the guide device.

One end portion and the other end portion of the first cam groove may be present in different positions from one end portion and the other end portion of the second cam groove, respectively, based on the circumferential direction and wherein an angle formed by the one end portion and the other end portion of the first cam groove in the circumferential direction and an angle formed by the one end portion and the other end portion of the second cam groove in the circumferential direction are equal to each other.

The first cam groove and the second cam groove may be formed on an inner circumferential surface of the ring member without passing through the ring member in the radial direction.

Through holes passing through the ring member in the radial direction may be formed at the one end portion and the other end portion of the first cam groove and the one end portion and the other end portion of the second cam groove.

The assembly may further comprise a lens mount coupled to the housing in the direction parallel to the optical axis, the lens mount being detachable from a camera body by forming a coupling screw on one side.

According to a camera lens assembly in accordance with the present invention, in a configuration in which a single pin is coupled to a spiral groove formed on a manual ring, a user may easily operate the manual ring with a small force.

In addition, a circumferential angle formed by the spiral groove may be secured as large as possible, preferably 3000 or more. Accordingly, more precise rotational operation of the manual ring is possible based on the same pitch. Eventually, precise focus adjustment in the camera lens assembly is possible.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EMBODIMENTS

Figure 1:
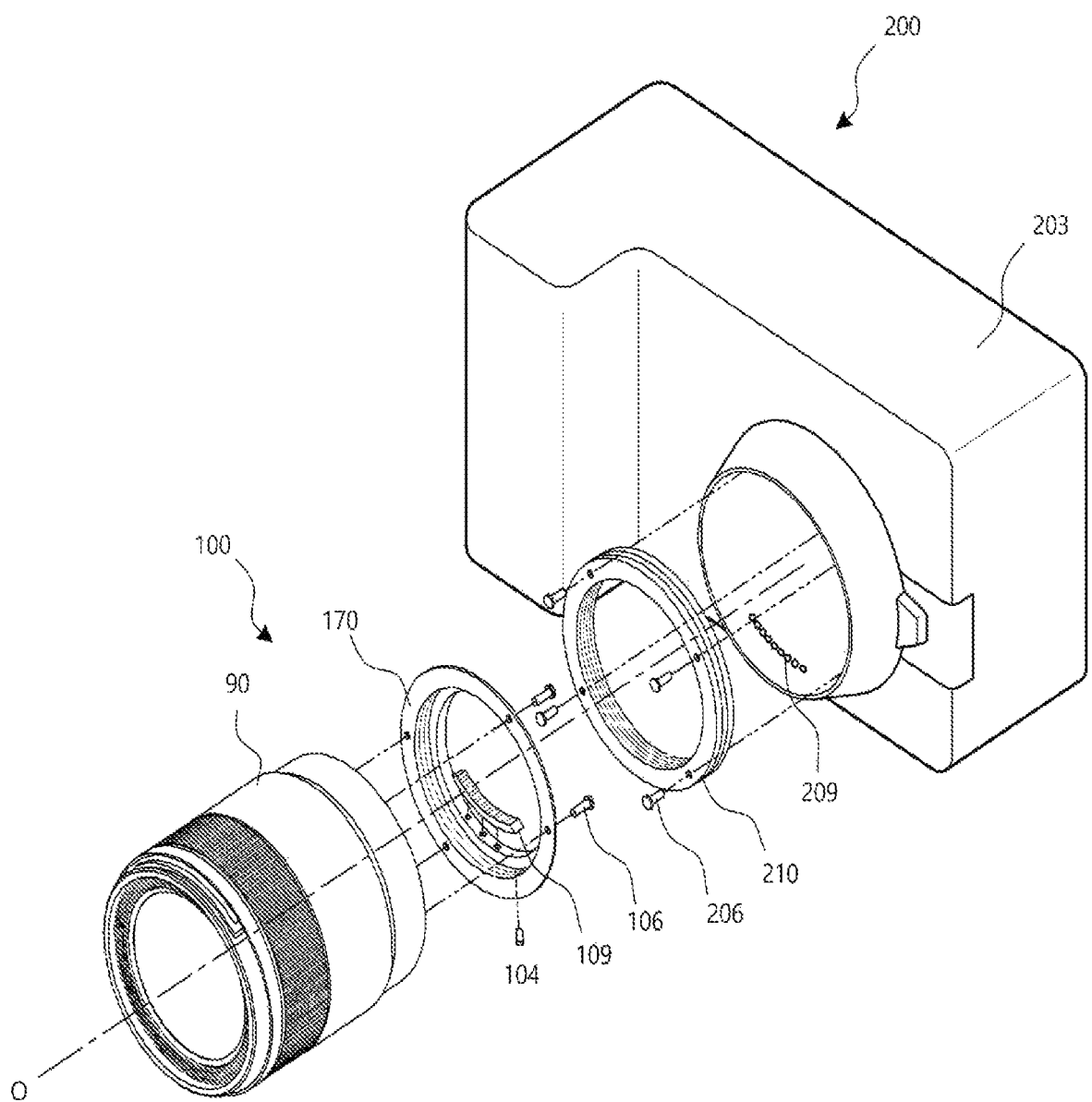
FIG. 1 is an exploded perspective view showing an assembly shape of a camera lens assembly and a camera body according to an embodiment of the present invention.

Advantages and features of the disclosure and methods to achieve them will become apparent from the descriptions of exemplary embodiments herein below with reference to the accompanying drawings. However, the inventive concept is not limited to exemplary embodiments disclosed herein but may be implemented in various ways. The exemplary embodiments are provided for making the disclosure of the inventive concept thorough and for fully conveying the scope of the inventive concept to those skilled in the art. It is to be noted that the scope of the disclosure is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the embodiments rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, exemplary embodiments of the present disclosure will be described in detail with reference to the accompanying drawings.

Herein, a member having a certain reference numeral and a member post-fixed with "a," "b," "−1," "−2," etc. to a reference numeral are a higher concept and a lower concept, respectively. Therefore, the latter indicates that it is a sub-combination of the former.

Hereinafter, an embodiment of the present invention will be described in detail with reference to the accompanying drawings.

FIG. 1 is an exploded perspective view showing an assembly shape of a camera lens assembly 100 and a camera body 200 according to an embodiment of the present invention. An optical axis O is an axis representing the center of a light beam from a subject facing the camera lens assembly 100. The camera lens assembly 100 and the camera body 200 may be fixed to each other by locking pins (not shown) or screws in a state in which contact surfaces of a lens mount 170 and a camera mount 210 are in contact with each other.

A camera housing 203 is a housing that holds each component of the camera body 200. More specifically, the camera housing 203 may include a camera mount 210, a camera-side electrical connector 209 serving as a connection between communication units, and a camera mount fixing member 206.

The lens mount 170 is fixed to a lens housing 90 by a lens mount fixing member 106. A lens-side electrical connector 109 is installed on the camera lens assembly 100 side, and in particular may be fixed to the lens mount 170 by a fixing member 104. Therefore, when assembling the camera lens assembly 100 and the camera body 200, the lens-side electrical connector 109 is in electrical contact with the camera-side electrical connector 209, and thus, the camera lens assembly 100 and the camera body 200 may communicate with each other.

Figure 2A:
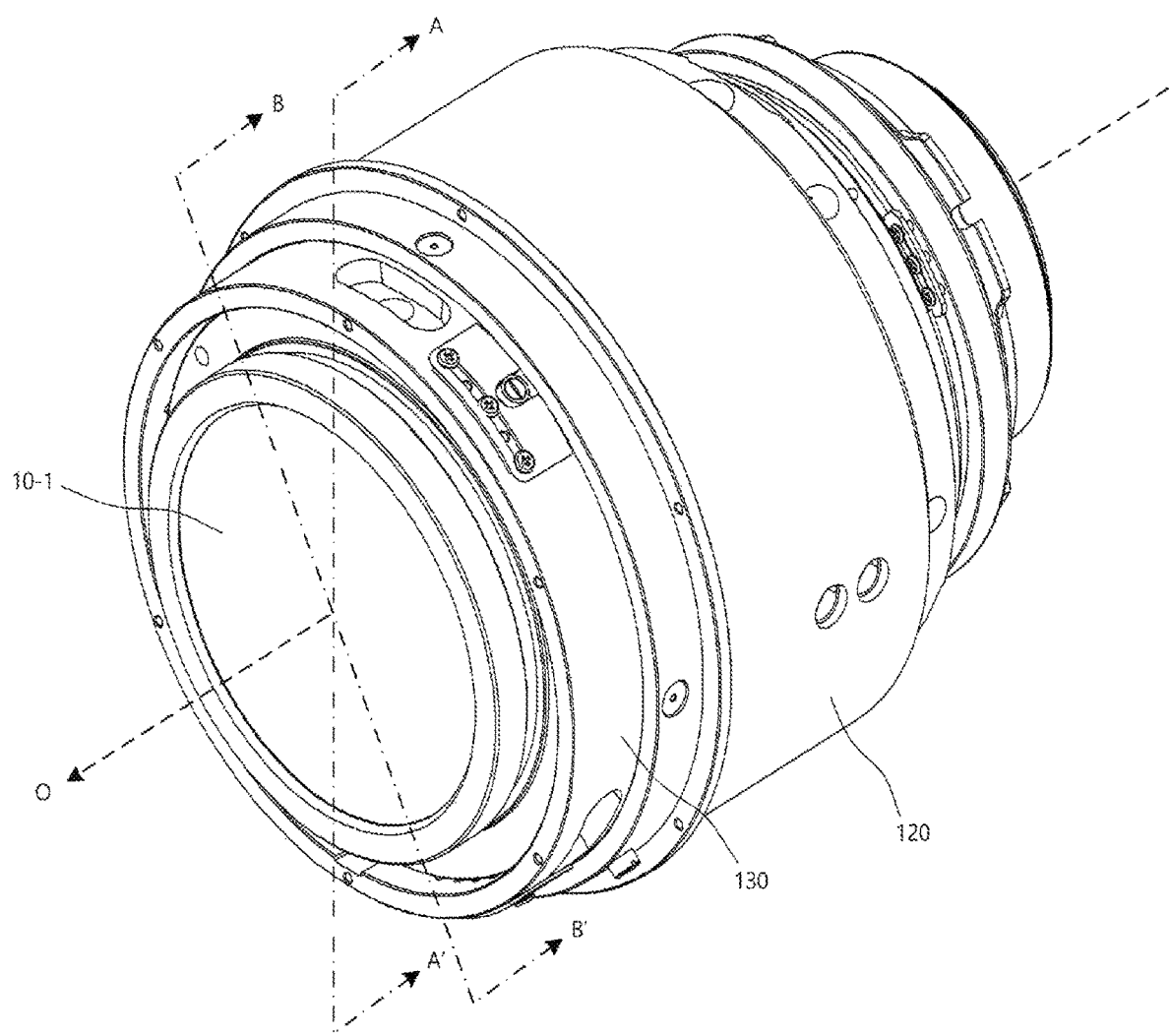
FIG. 2A is a perspective view showing the camera lens assembly according to the embodiment of the present invention.
Figure 2B:
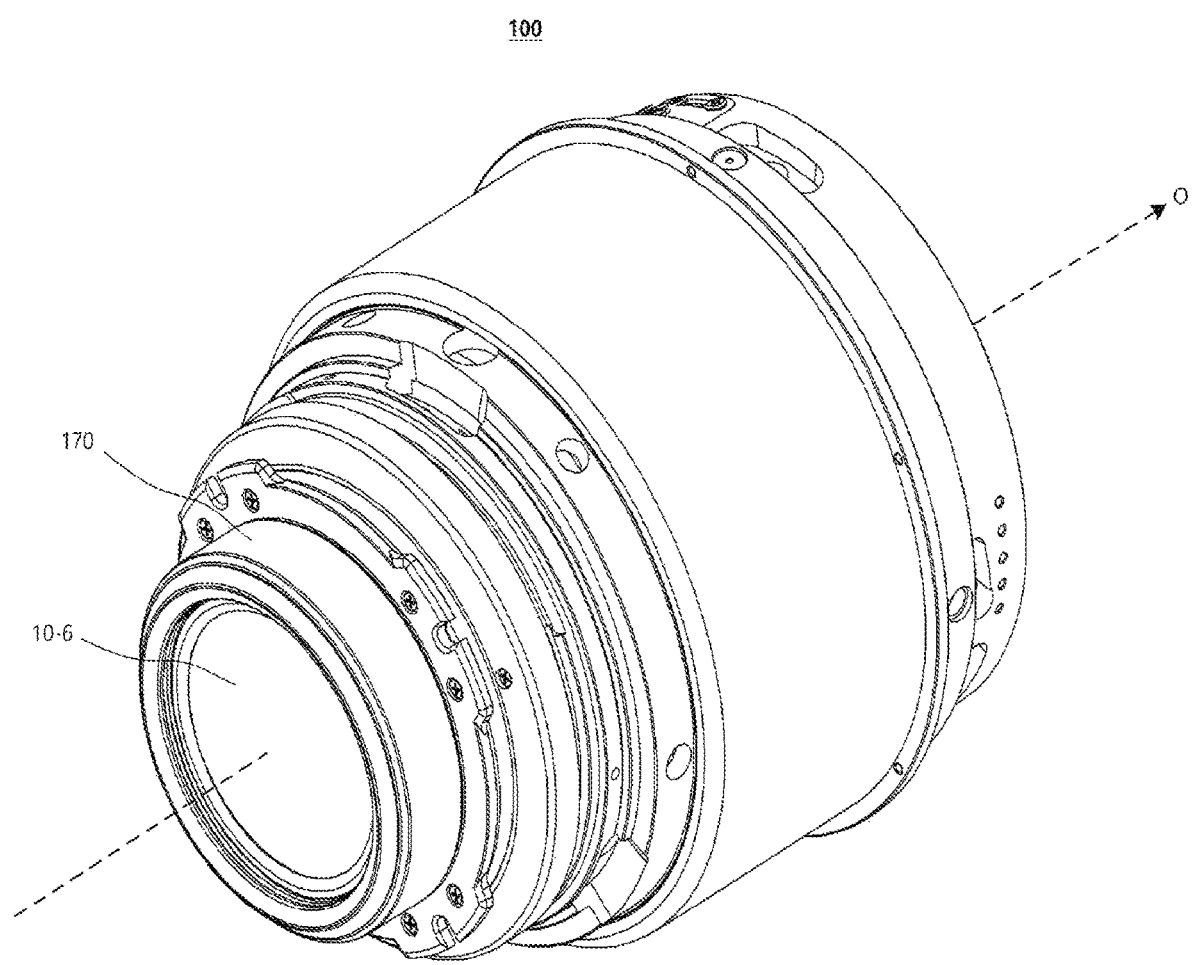
FIG. 2B is a perspective view of the camera lens assembly of FIG. 2A viewed from the opposite side.

FIG. 2A is a perspective view showing the camera lens assembly 100 according to the embodiment of the present invention. FIG. 2B is a perspective view of the camera lens assembly 100 of FIG. 2A viewed from the opposite side.

The camera lens assembly 100 includes a housing 130 accommodating internal components, a ring member 120 rotatable in an optical axis O direction with respect to the housing 130 by a user's operation, and at least one or more optical lenses (10-1, 10-6, etc.) included in the housing 130. It is described as an example in which the ring member 120 is a manual ring that may be rotated in a state held by the user by hand. However, it is not limited thereto, and it does not exclude the case of electrically controlling rotation by providing a separate motor. In order to allow the ring member 120 to rotate smoothly with respect to the housing 130, a bearing structure, not shown, may be used.

Figure 3A:
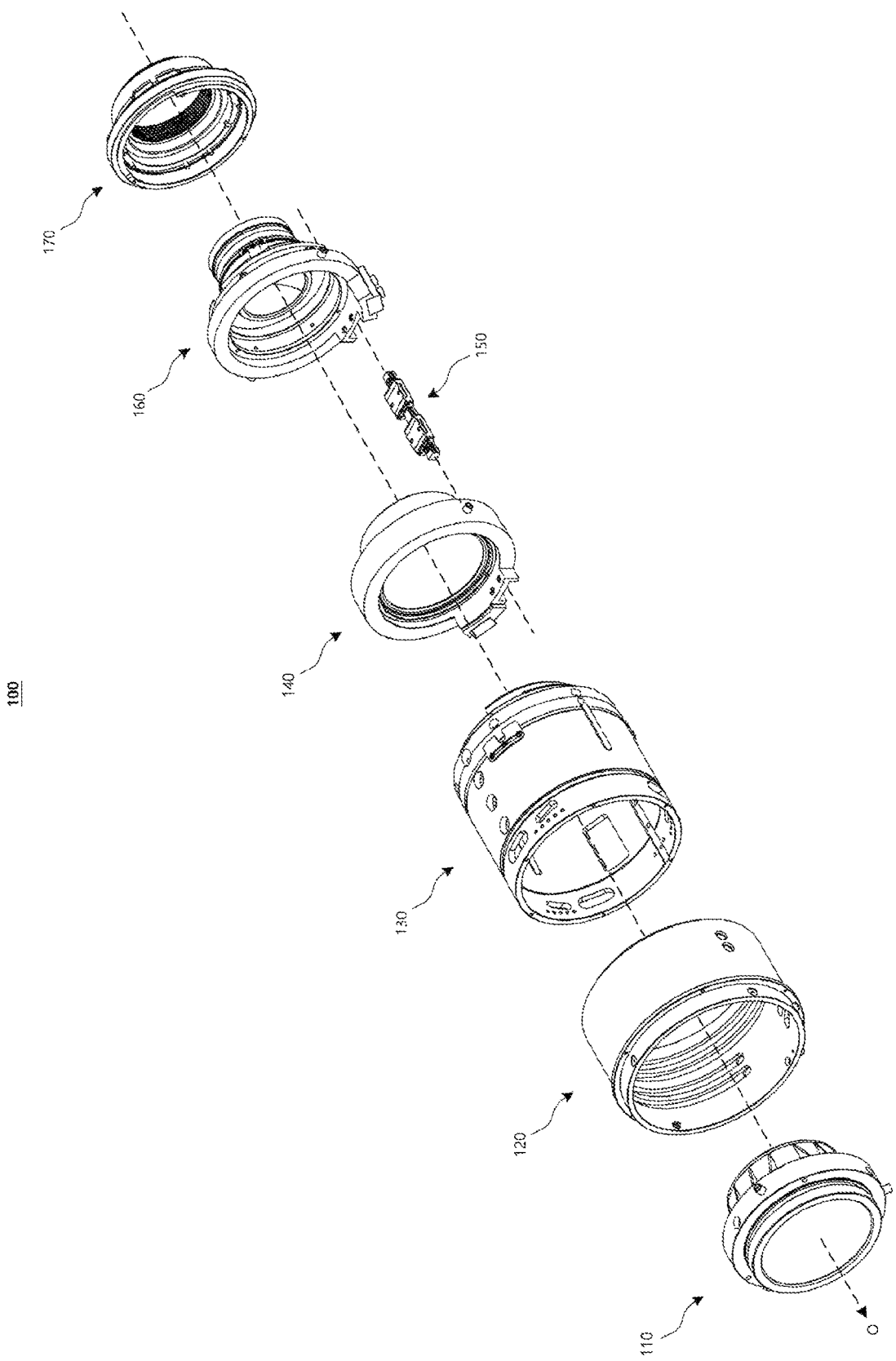
FIG. 3A is an exploded perspective view of the camera lens assembly shown in FIG. 1A.
Figure 3B:
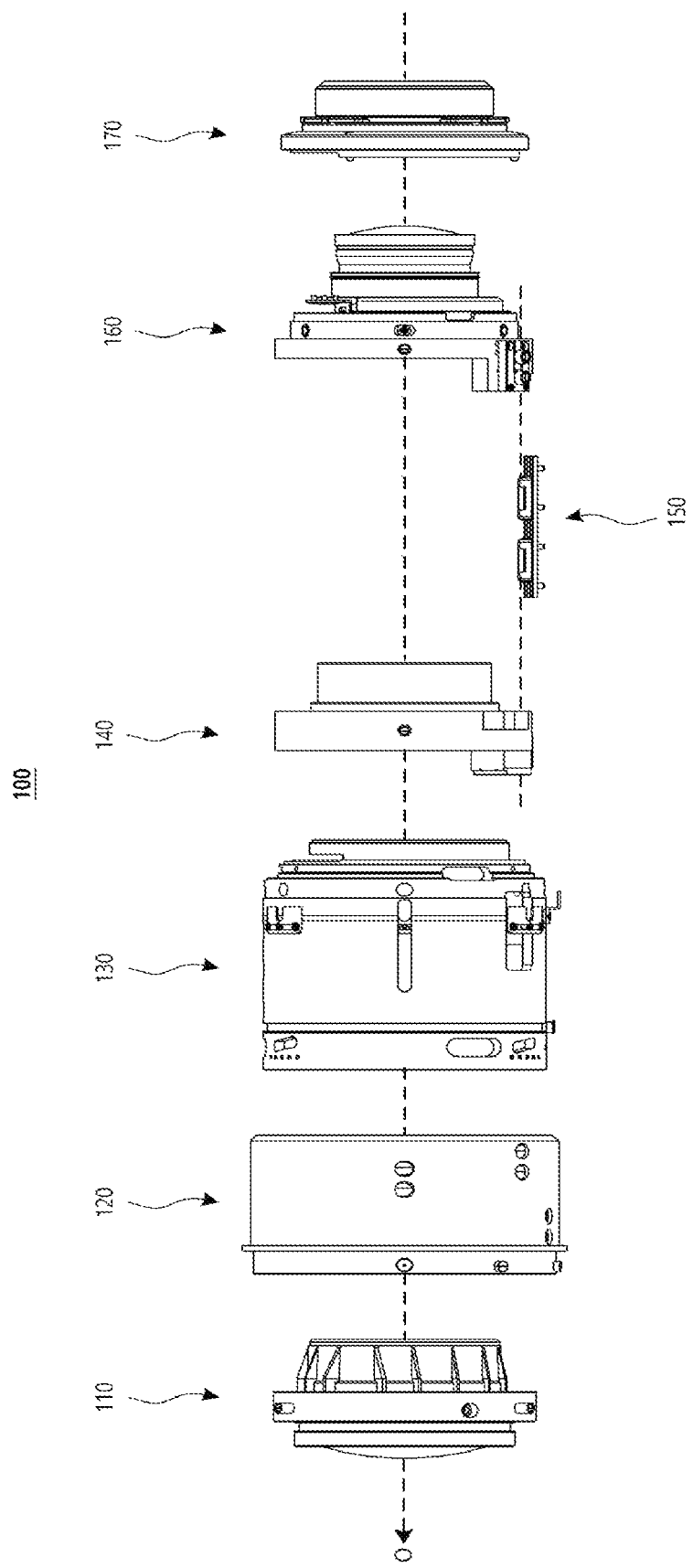
FIG. 3B is a plan view of the exploded perspective view of FIG. 3A viewed from the side.

FIG. 3A is an exploded perspective view of the camera lens assembly 100 shown in FIG. 1A. FIG. 3B is a plan view of the exploded perspective view of FIG. 3A viewed from the side.

As shown, the camera lens assembly 100 according to the embodiment of the invention may include first and second lens holders 140 and 160 movable in the optical axis O direction, a guide device 150 for guiding a movement of the first and second lens holders 140 and 160 in a linear direction, a housing 130 for accommodating the components, and a ring member 120 rotatably coupled to an outer diameter of the housing 130.

In addition, it may further include a fixed lens holder 110 together with the movable lens holders 140 and 160, and a lens mount 170 that may be coupled to the housing 130. The fixed lens holder 110 may be disposed at the front based on the optical axis O.

Figure 4A:
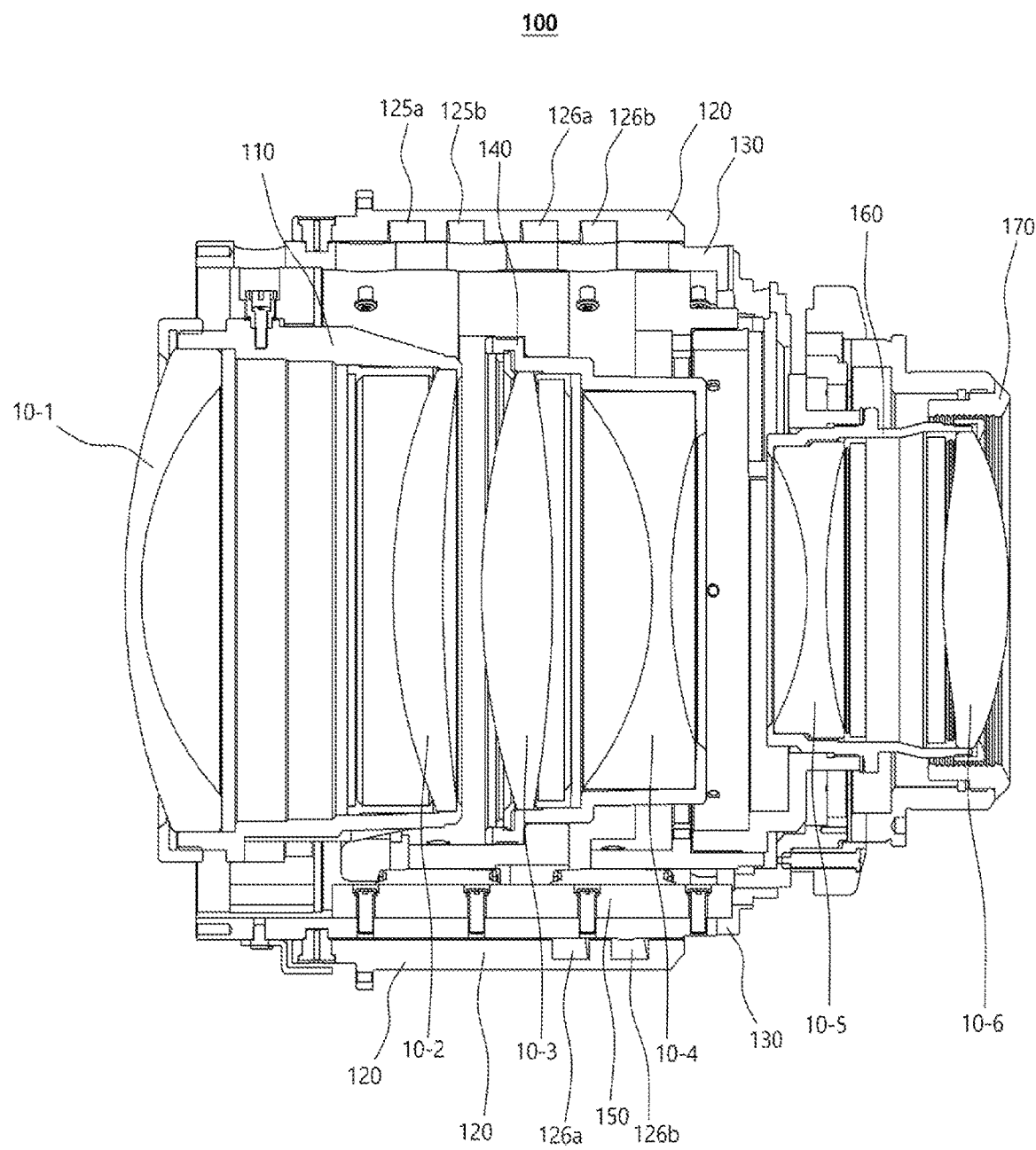
FIG. 4A is a longitudinal cross-sectional view taken along a direction A-A' of the camera lens assembly shown in FIG. 1A.
Figure 4B:
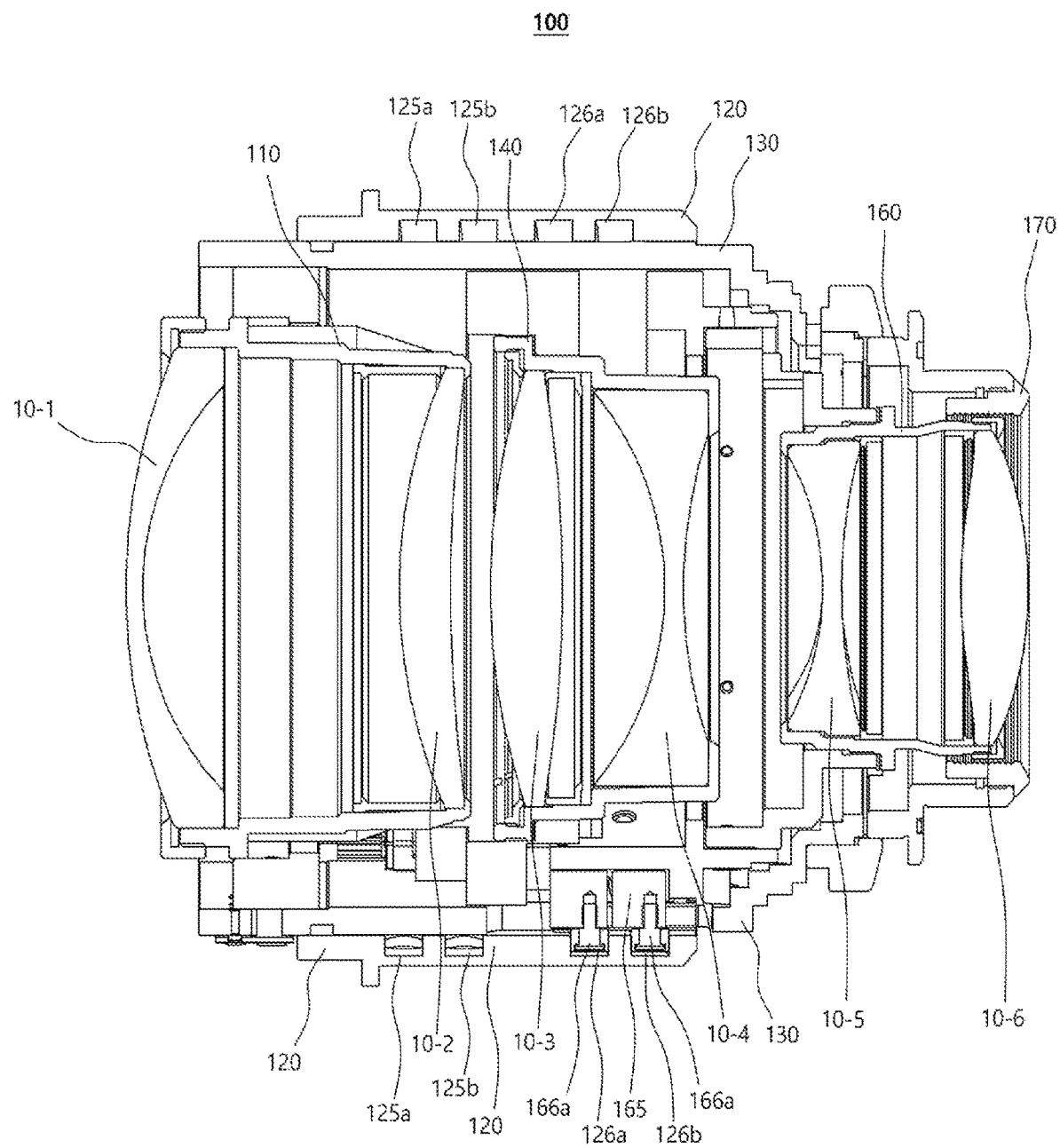
FIG. 4B is a longitudinal cross-sectional view of the camera lens assembly shown in FIG. 1A taken in a direction B-B'.

FIG. 4A is a longitudinal cross-sectional view taken along a direction A-A' of the camera lens assembly 100 shown in FIG. 1A. FIG. 4B is a longitudinal cross-sectional view of the camera lens assembly 100 shown in FIG. 1A taken in a direction B-B'.

The camera lens assembly 100 basically includes lens holders 140 and 160 for accommodating at least one of a plurality of lenses 10: 10-1 to 10-6, and pins 146 and 166 protruding from the lens holders 140 and 160 in a radial direction. In FIG. 4B, due to an angle of the section, only pins 166a and 166b engaged (inserted) into second cam grooves 126a and 126b are shown. Pins 146a and 166b engaged with first cam grooves 125a and 125b are also present at different angular positions.

The ring member 120 is formed with a plurality of cam grooves 125a, 125b, 126a, and 126b formed in a spiral direction so as to have a predetermined pitch along the optical axis O, in which the pins 146a, 146b, 166a, and 166b are engaged with the cam grooves 125a, 125b, 126a, and 126b. Therefore, when the ring member 120 rotates according to the user's operation, the pins 146a, 146b, 166a, and 166b move along the plurality of cam grooves 125a, 125b, 126a, and 126b. Here, the guide device 150 limits the plurality of cam grooves 125a, 125b, 126a, and 126b to move only in the optical axis O direction. With the guide device 150, even if the ring member 120 rotates, the pins 146a, 146b, 166a, and 166b and the lens holders 140 and 160 coupled thereto may move only in the optical axis O direction without rotation.

In addition, the housing 130 accommodates the movable lens holders 140 and 160, and the guide device 150 is mounted on an inner circumferential surface of the housing 130. In addition, the ring member 120 is rotatably coupled to an outer diameter of the housing 130 with respect to the housing 130.

The movable first lenses 10-3 and 10-4 are mounted on the first lens holder 140, and the movable second lenses 10-5 and 10-6 are mounted on the second lens holder 160. In addition, separately from this, a fixed lens holder 110 fixed to the housing 130 may be further provided, and fixed third lenses 10-1 and 10-2 may be mounted thereon. For example, the third lenses 10-1 and 10-2 are lenses closer to an image-side O than the first and second lenses 10-3, 10-4, 10-5, and 10-6.

Figure 5A:
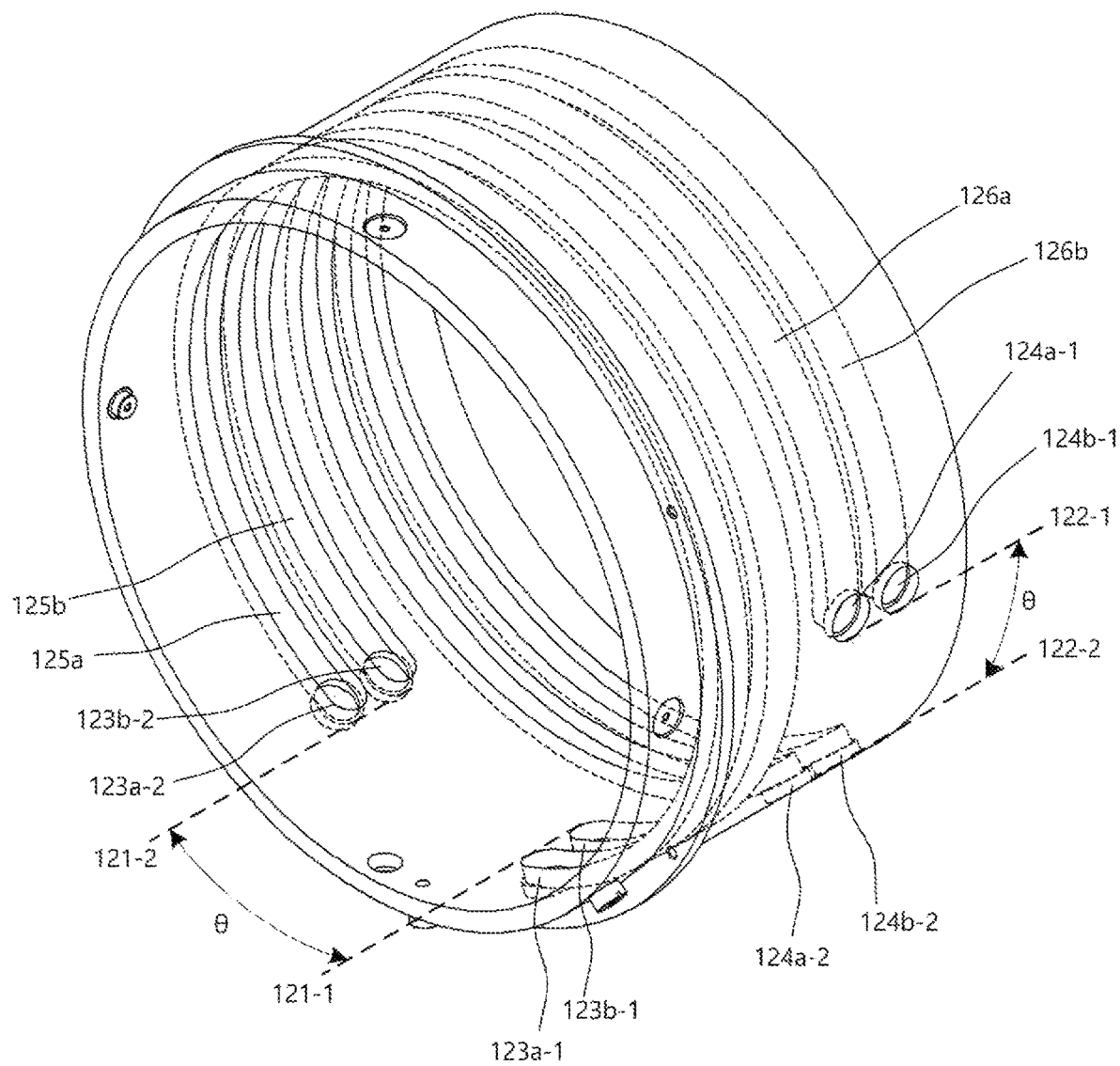
FIG. 5A is a perspective view showing the ring member of FIG. 3A.
Figure 5B:
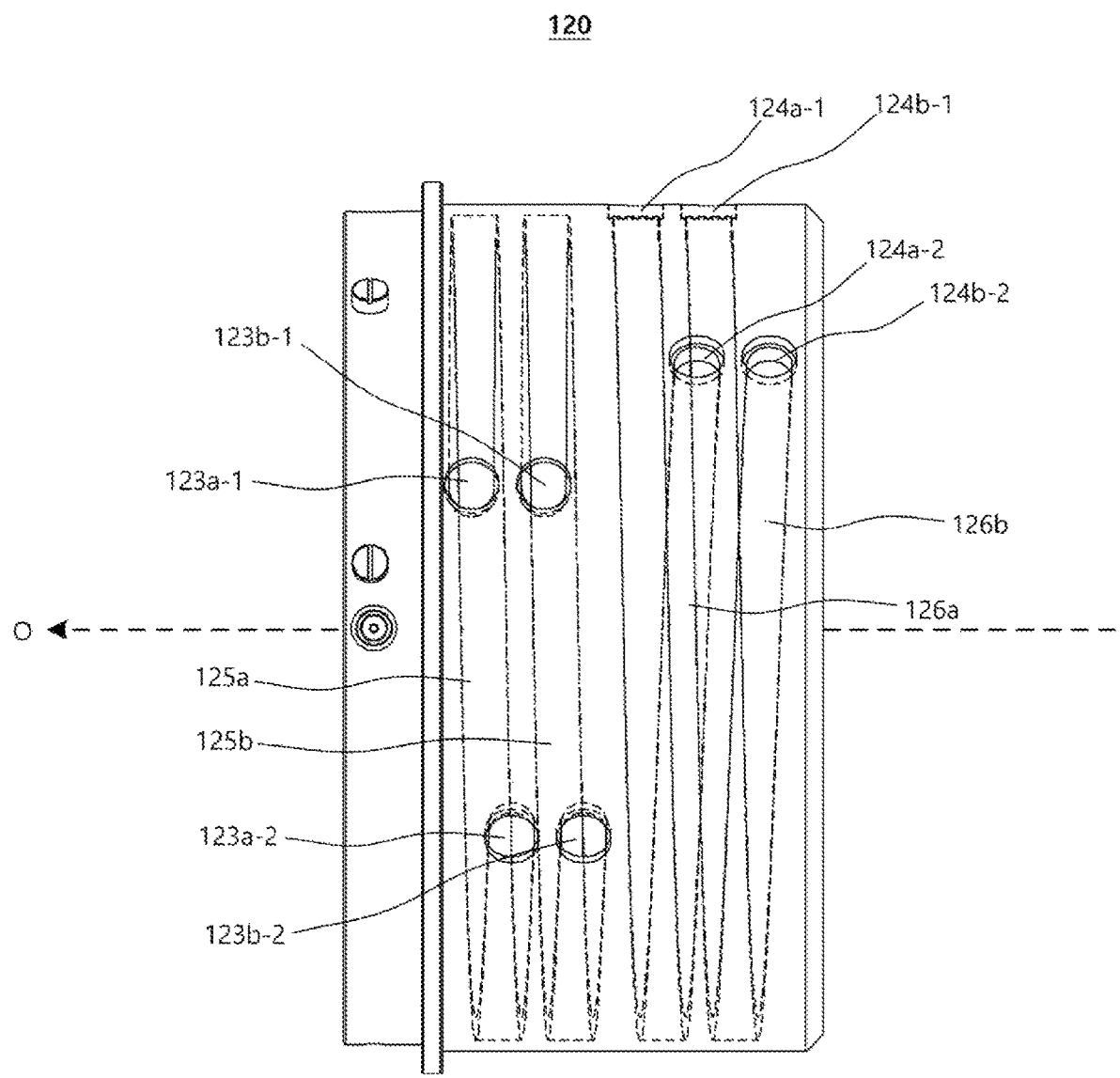
FIG. 5B is a side view showing the ring member of FIG. 5A.
Figure 5C:
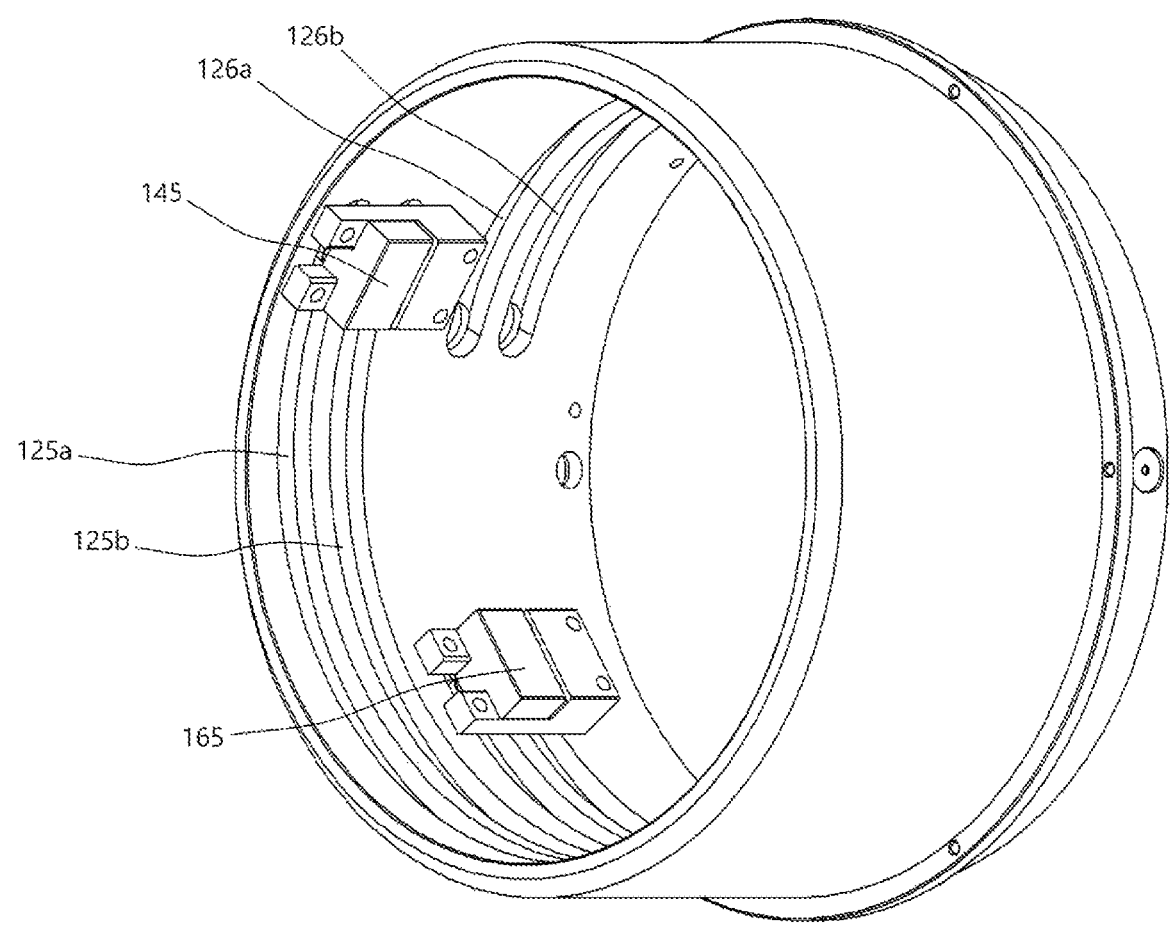
FIG. 5C is a perspective view illustrating a state in which pin blocks are coupled to the cam grooves of the ring member of FIG. 3A.

FIG. 5A is a perspective view showing the ring member 120 of FIG. 3A. FIG. 5B is a side view showing the ring member 120 of FIG. 5A. FIG. 5C is a perspective view illustrating a state in which pin blocks 145 and 165 are coupled to the cam grooves 125a, 125b, 126a, and 126b of the ring member 120 of FIG. 3A.

As shown in FIG. 5A, the first cam grooves 125a and 125b and the second cam grooves 126a and 126b may be formed on an inner circumferential surface of the ring member 120 without penetrating the ring member 120 in a radial direction. Here, through holes 123a-1, 123a-2, 123b-1, 123b-2, 124a-1, 124a-2, 124b-1, and 124b-2 passing through the ring member 120 in the radial direction are formed at one end portion (first end portion) 121-1 and the other end portion (second end portion) 121-2 of the first cam grooves 125a and 125b and one end portion 122-1 and the other end portion 122-2 of the second cam grooves 126a and 126b. These through holes allow the user to observe the pins 146a, 146b, 166a, and 166b of the pin blocks 145 and 165 coupled to the cam grooves 125a, 125b, 126a, and 126b from the outside. Accordingly, the user may visually confirm that the pins 146a, 146b, 166a, and 166b have moved to a position where they may no longer move while rotating the ring member 120.

The first cam grooves 125a and 125b and the second cam grooves 126a and 126b have different pitches. Therefore, when the ring member 120 rotates by the user's operation, a distance between the first lenses 10-3 and 10-4 installed on the first lens holder 140 and the second lenses 10-5 and 10-6 installed on the second lens holder 160 may vary. This is because when one wants to change a camera's optical magnification or adjust a focus, the first lenses 10-3 and 10-4 accommodated in the first lens holder 140 and the second lenses 10-5 and 10-6 accommodated in the second lens holder 160 need to move different distances from each other. Therefore, it is preferable that the first cam grooves 125*a* and 125*b* and the second cam grooves 126*a* and 126*b* have different pitches. Herein, the "pitch" means a distance in the optical axis O direction between one end portion and the other end portion, as shown in FIG. 5B. Two pins 146*a* and 146*b* or 166*a* and 166*b* in one pin blocks 145 and 165 must have the same moving distance. Therefore, two grooves in the first cam grooves 125*a* and 125*b* or the second cam grooves 126*a* and 126*b* may have the same pitch. In other words, the two grooves may be formed in the spiral direction parallel to each other.

Therefore, when the ring member 120 is rotated by the user's operation, the first and second lens holders 140 and 160 on which the pins 146*a*, 146*b*, 166*a*, and 166*b* are formed may move in the optical axis O direction within a predetermined pitch of a corresponding cam groove under the guide of the guide device 150.

Here, an angle at which the cam grooves 125*a*, 125*b*, 126*a*, and 126*b* are formed in a circumferential direction of the ring member 120 is greater than 180°, preferably 300° or more, as shown in FIG. 5A. Conventionally, since these cam grooves are divided into a plurality of numbers in the circumferential direction, the angle formed in the circumferential direction is very limited. However, in the embodiment of the present invention, since only one pin is engaged in a specific cam groove, the angle at which the cam grooves are formed in the circumferential direction may have a very large value of 300° or more. Therefore, a rotation angle of the ring member 120 may be maximized, and this enables precise magnification change or precise focus adjustment through rotation of the ring member 120. In addition, in the present invention, in order to smooth a linear movement of the pin according to the rotation of the ring member 120 even in a structure in which one pin is engaged in one cam groove, the guide device 150 that provides smooth movement even with a small force is used.

In order to balance the force when the user operates the ring member 120, the pin blocks 145 and 165 may be positioned at different positions in the circumferential direction. Therefore, one end portion 121-1 and the other end portion 121-2 of the first cam grooves 125*a* and 125*b* corresponding to the first pin block 145 are present in different positions based on the circumferential direction of one end portion 122-1 and the other end portion 122-2 of the second cam grooves 126*a* and 126*b* corresponding to the second pin block 165, respectively. In other words, there is an offset (angle difference) in the circumferential direction between one end portion 121-1 of the first cam groove 125*a* and 125*b* and one end portion 122-1 of the second cam groove 126*a* and 126*b*, and between the other end portion 121-2 of the first cam grooves 125*a* and 125*b* and the other end portion 122-2 of the second cam grooves 126*a* and 126*b*.

Here, a total rotation angle of the ring member 120 rotated by the user is the same for both cases. Therefore, an angle formed by one end portion 121-1 and the other end portion 121-2 of the first cam grooves 125*a* and 126*b* in the circumferential direction and an angle formed by one end portion 122-1 and the other end portion 122-2 of the second cam grooves 126*a* and 126*b* in the circumferential direction are equal to each other. Here, the same angle will be 360-θ with reference to FIG. 5A.

Figure 6A:
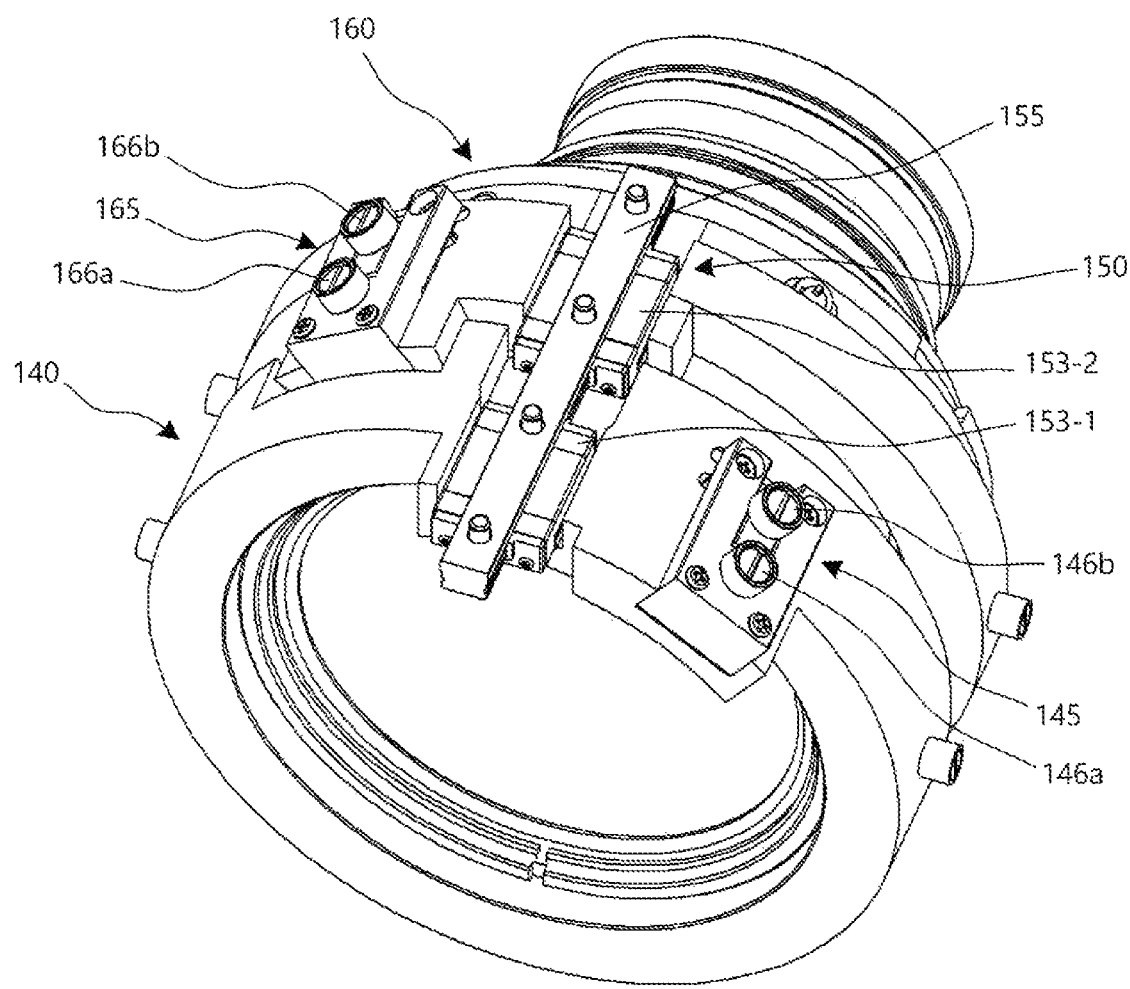
FIG. 6A is a perspective view showing a state in which the first lens holder, the guide device, and the second lens holder shown in FIG. 3A are assembled to each other.
Figure 6B:
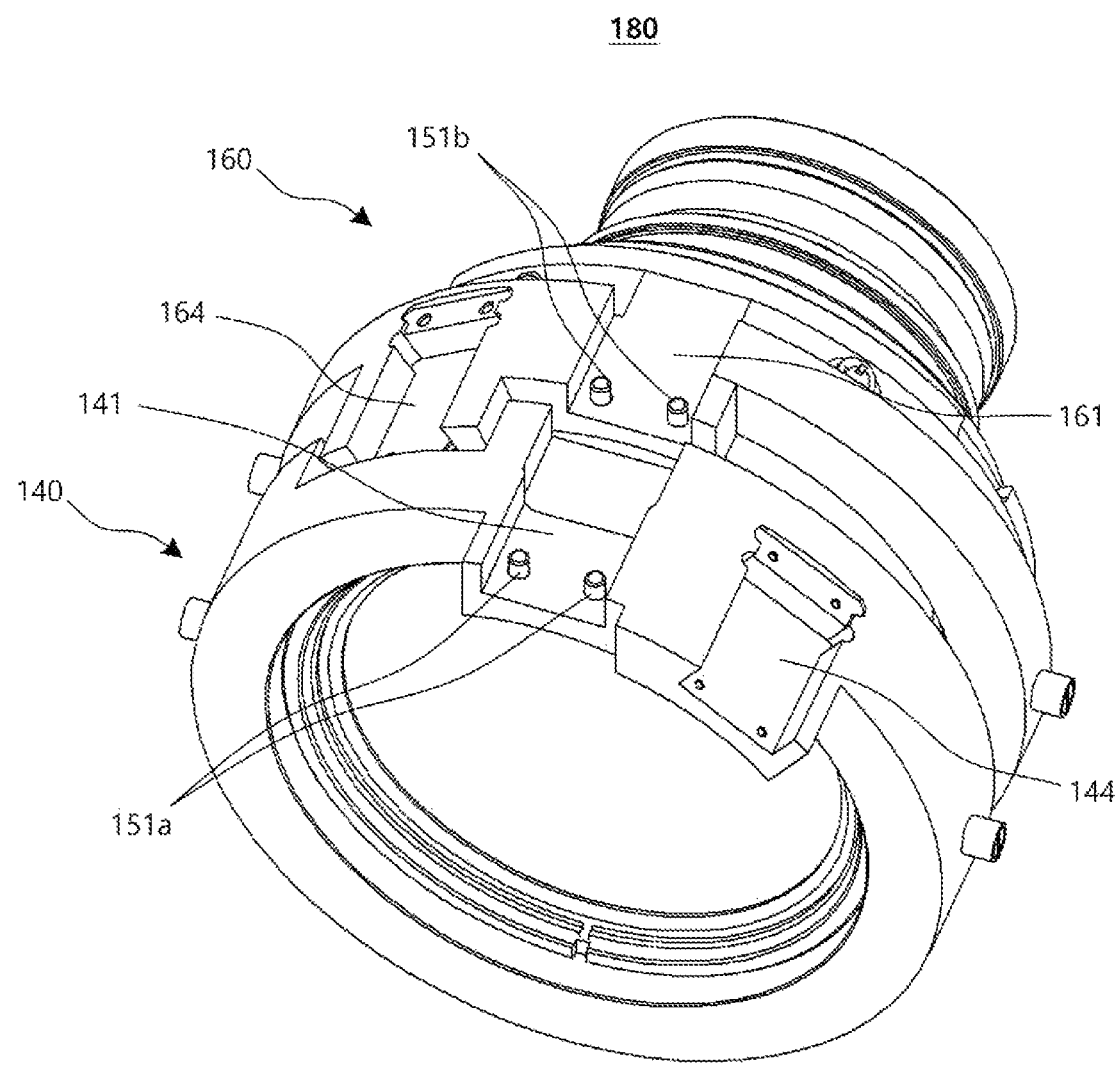
FIG. 6B is a perspective view of FIG. 6A with the guide device and the pin blocks removed.

FIG. 6A is a perspective view showing a state in which the first lens holder 140, the guide device 150, and the second lens holder 150 shown in FIG. 3A are assembled to each other. FIG. 6B is a perspective view of FIG. 6A with the guide device 150 and the pin blocks 145 and 165 removed.

Referring to FIG. 6A, the first pin block 145 is installed on the first lens holder 140, and the second pin block 165 is installed on the second lens holder 160. In addition, a guide rail 155 of the guide device 150 is fixed to the inner circumferential surface of the housing 130, and two carriage blocks 153-1 and 153-2 movable in the optical axis O direction with respect to the guide rail 155 are fixed to the first and second lens holders 140 and 160, respectively. Therefore, a distance between the two carriage blocks 153-1 and 153-2 may be changed while moving in the optical axis O direction. Here, a distance between the first and second lens holders 140 and 160 may be changed as well.

As shown in FIG. 6A, the first pin block 145 installed on the first lens holder 140 and the second pin block 165 installed on the second lens holder 160 are positioned to be symmetrical in the circumferential direction based on the guide device 150. This provides a smoother feeling of operation by balancing the force in the circumferential direction when the user rotates the ring member 120.

Referring to FIG. 6B, the first pin block 145, the second pin block 165, the first carriage block 153-1, and the second carriage block 153-2 may be fixedly mounted on flat mounting pockets (in the order of 144, 164, 141, and 161), respectively.

Due to this structure, when the pins 146*a* and 146*b* of the first pin block 145 are engaged with the first grooves 125*a* and 125*b* and the pins 166*a* and 166*b* of the second pin block 165 are engaged with the second grooves 126*a* and 126*b*, the user's operation of rotating the ring member 120 based on the optical axis O causes a travel of the first and second pin blocks 145 and 165 in the optical axis O direction. Since the first and second carriage blocks 153-1 and 153-2 of the guide device 150 move only along the guide rail 155, such a travel in the optical axis O direction may be ensured.

Figure 7A:
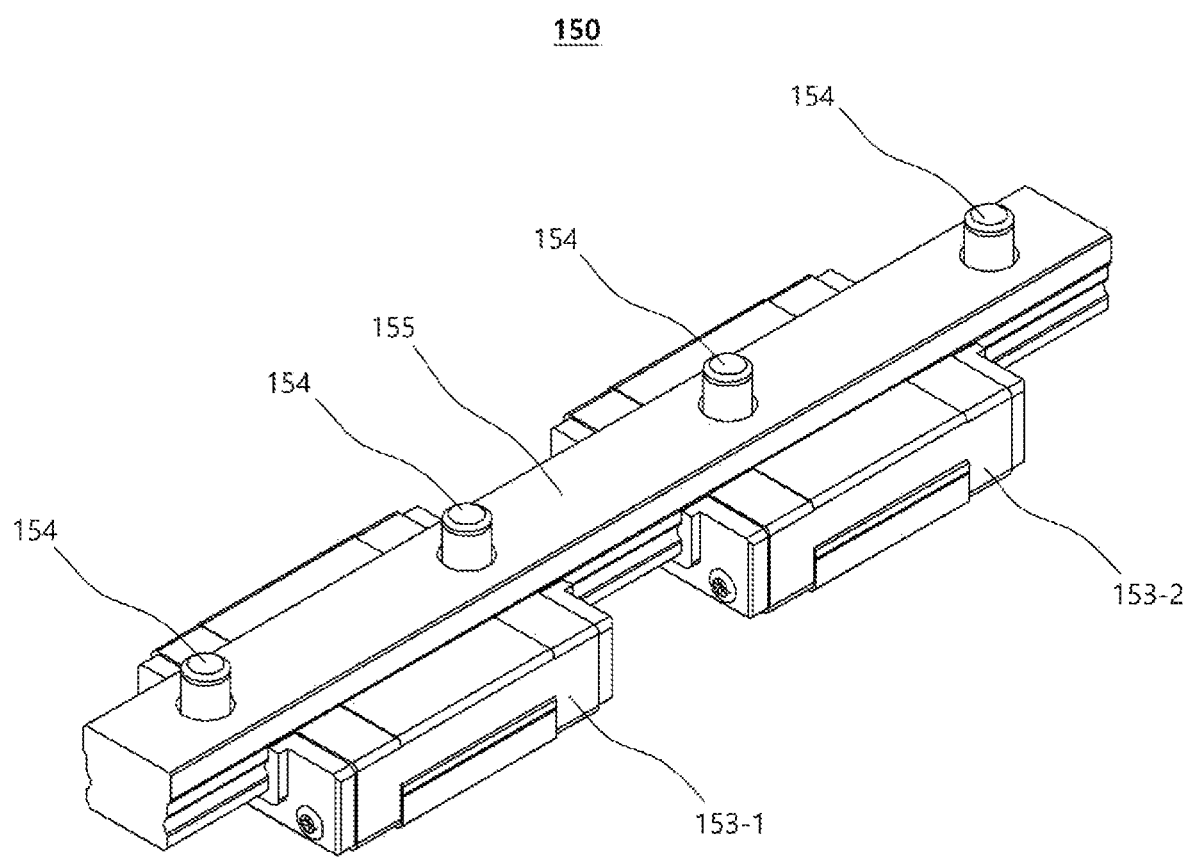
FIG. 7A is a perspective view showing the guide device shown in FIG. 3A.
Figure 7B:
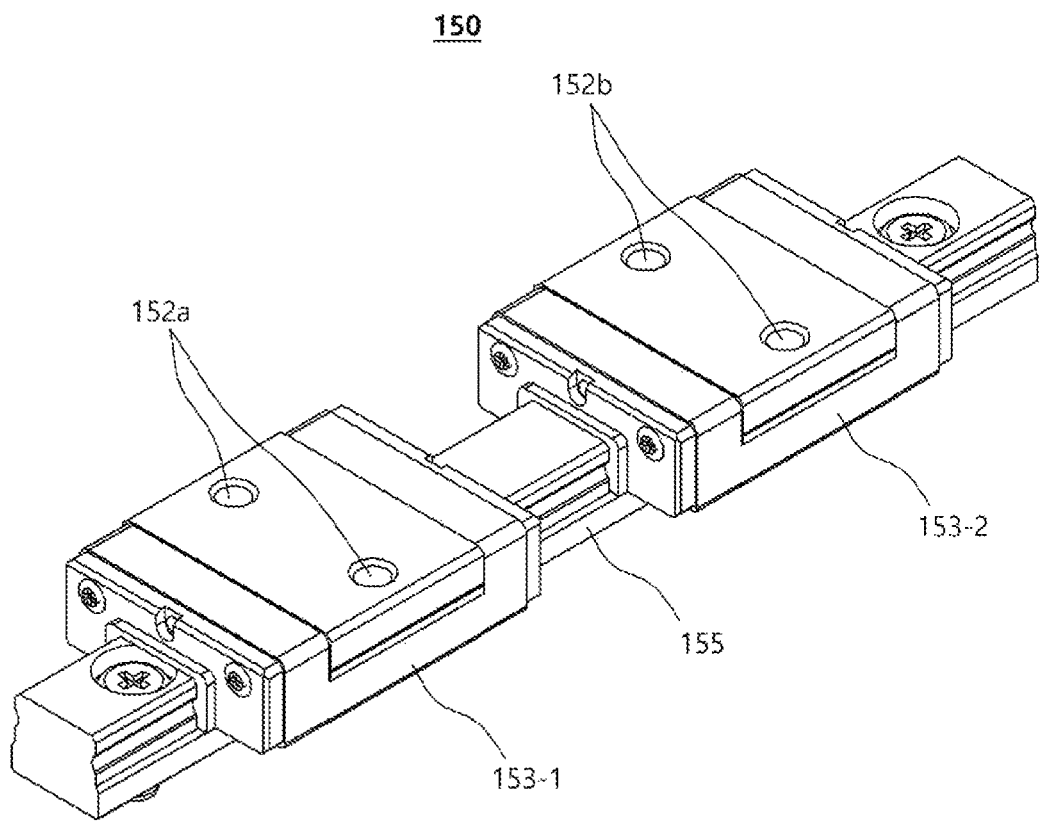
FIG. 7B is a perspective view of the guide device of FIG. 7A viewed from below.
Figure 7C:
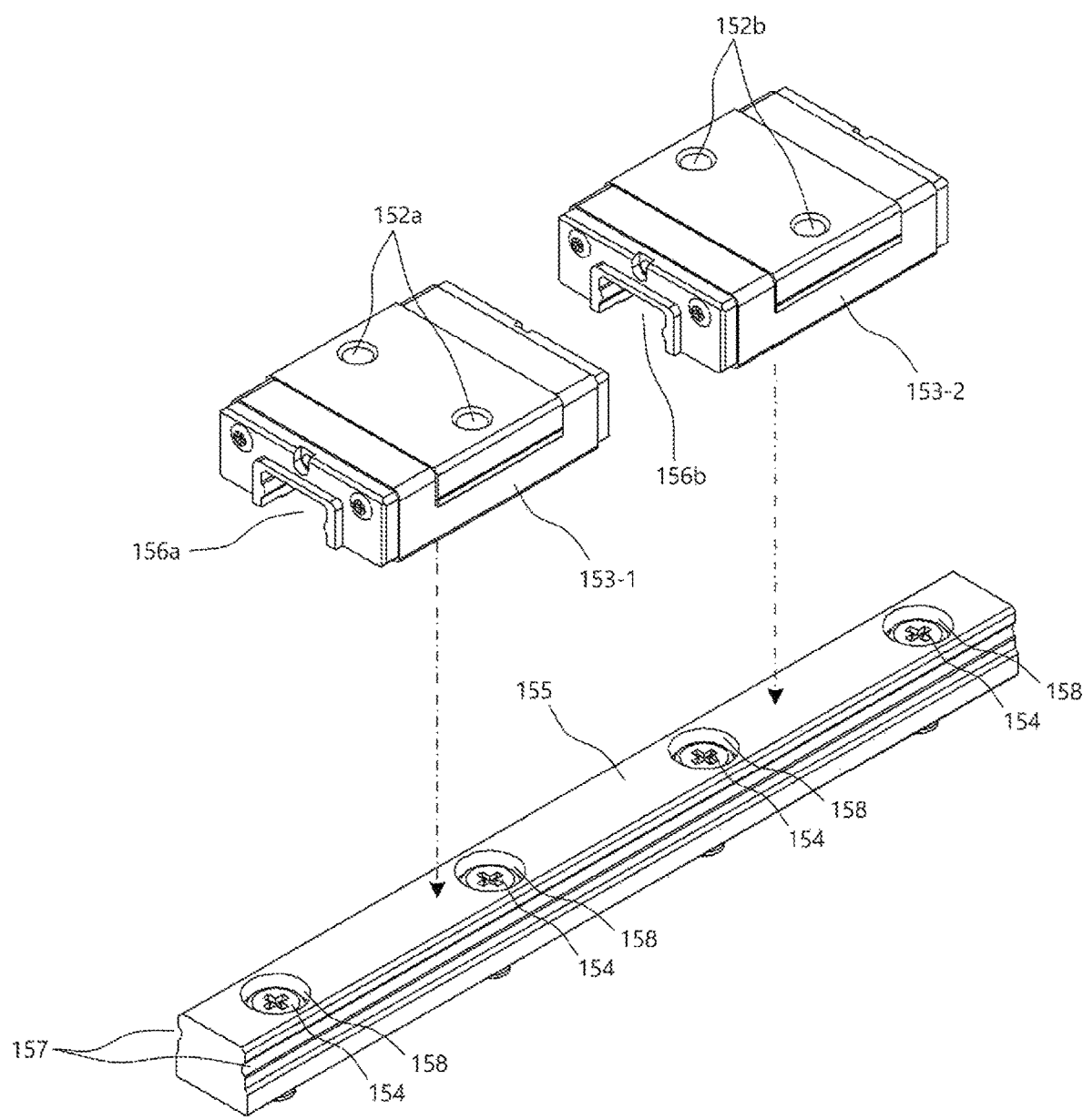
FIG. 7C is an exploded perspective view of the guide device of FIG. 7B.

FIG. 7A is a perspective view showing the guide device 150 shown in FIG. 3A. FIG. 7B is a perspective view of the guide device 150 of FIG. 7A viewed from below. FIG. 7C is an exploded perspective view of the guide device 150 of FIG. 7B.

The guide device 150 includes the guide rail 155 fastened to one side of the housing 130, and the carriage blocks 153-1 and 153-2 that are slidably coupled with the guide rail 155 to move in the optical axis O direction. The lens holders 140 and 160 may be fastened to the carriage blocks 153-1 and 153-2 to move together with the carriage block 153 in the optical axis O direction.

Here, the guide rail 155 may be fastened to the housing 130 by bolts 154 installed radial-outward. Here, the bolt 154 may pass through a through hole 158 formed in the guide rail 155 and may be fastened to a bolt hole (134 in FIG. 11A) of the housing.

In addition, the carriage blocks 153-1 and 153-2 are fastened to the lens holders 140 and 160 by other bolts (151*a* and 151*b* in FIG. 6B) installed radial-outward. Here, the bolts 151*a* and 151*b* may pass through the mounting pockets 141 and 161 and be fastened to the bolt holes 152*a* and 152*b* of the carriage blocks 153-1 and 153-2, respectively.

Referring to FIG. 7C, the carriage blocks 153-1 and 153-2 include recesses 156*a* and 156*b* extending along a longitudinal direction of the guide rail 155, and the guide rail 155 includes a guide 157 that extends along the longitudinal direction of the guide rail 155 and is engaged with the recesses 156a and 156b in the optical axis O direction. Here, the carriage blocks 153-1 and 153-2 are slidably coupled to the guide rail 155 by the engagement between the recesses 156a and 156b and the guide 157.

Figure 8A:
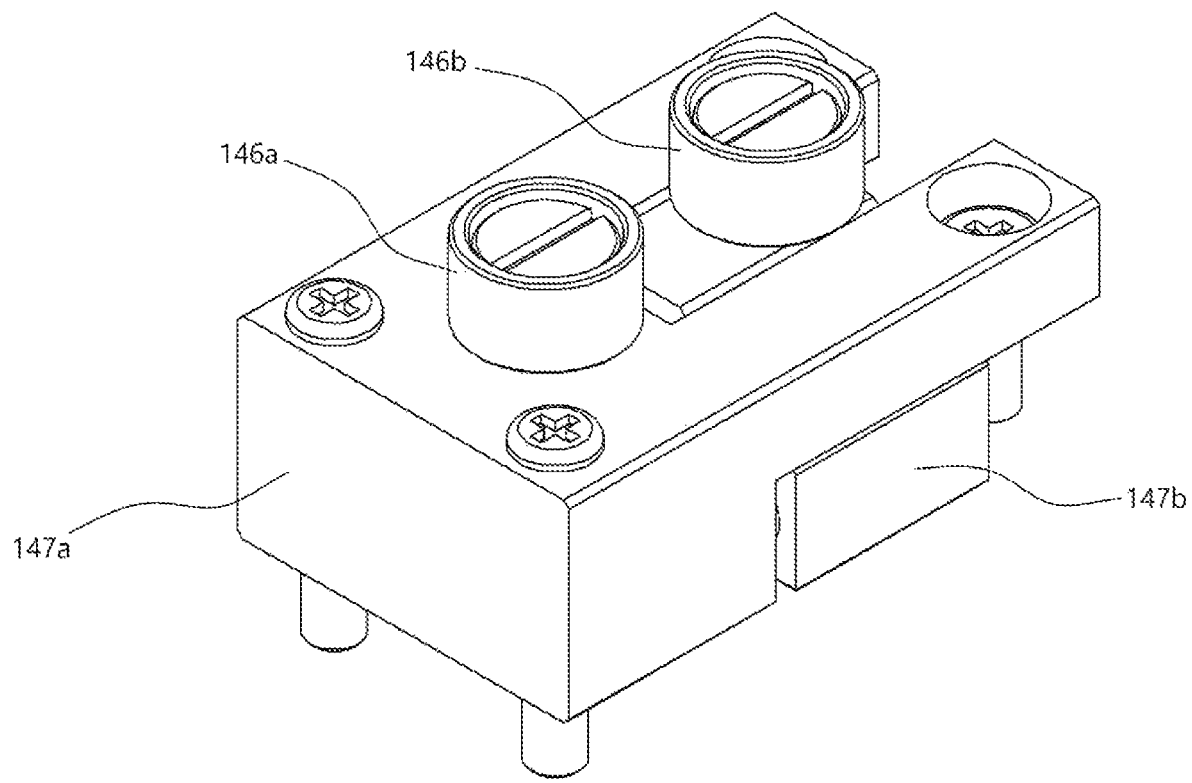
FIG. 8A is a perspective view showing the pin block of FIG. 6A in more detail.
Figure 8B:
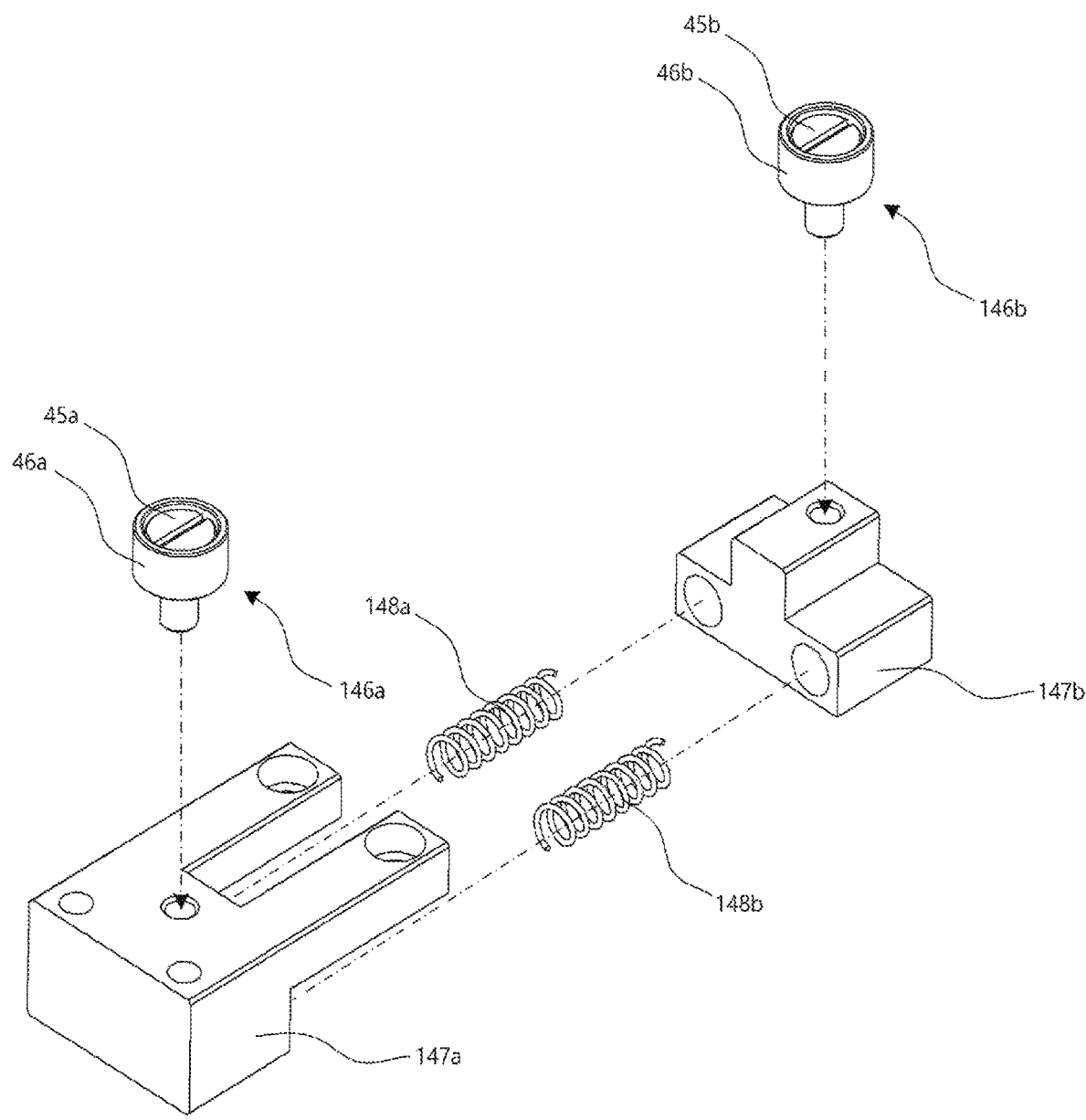
FIG. 8B is an exploded perspective view of the pin block of FIG. 6A.
Figure 8C:
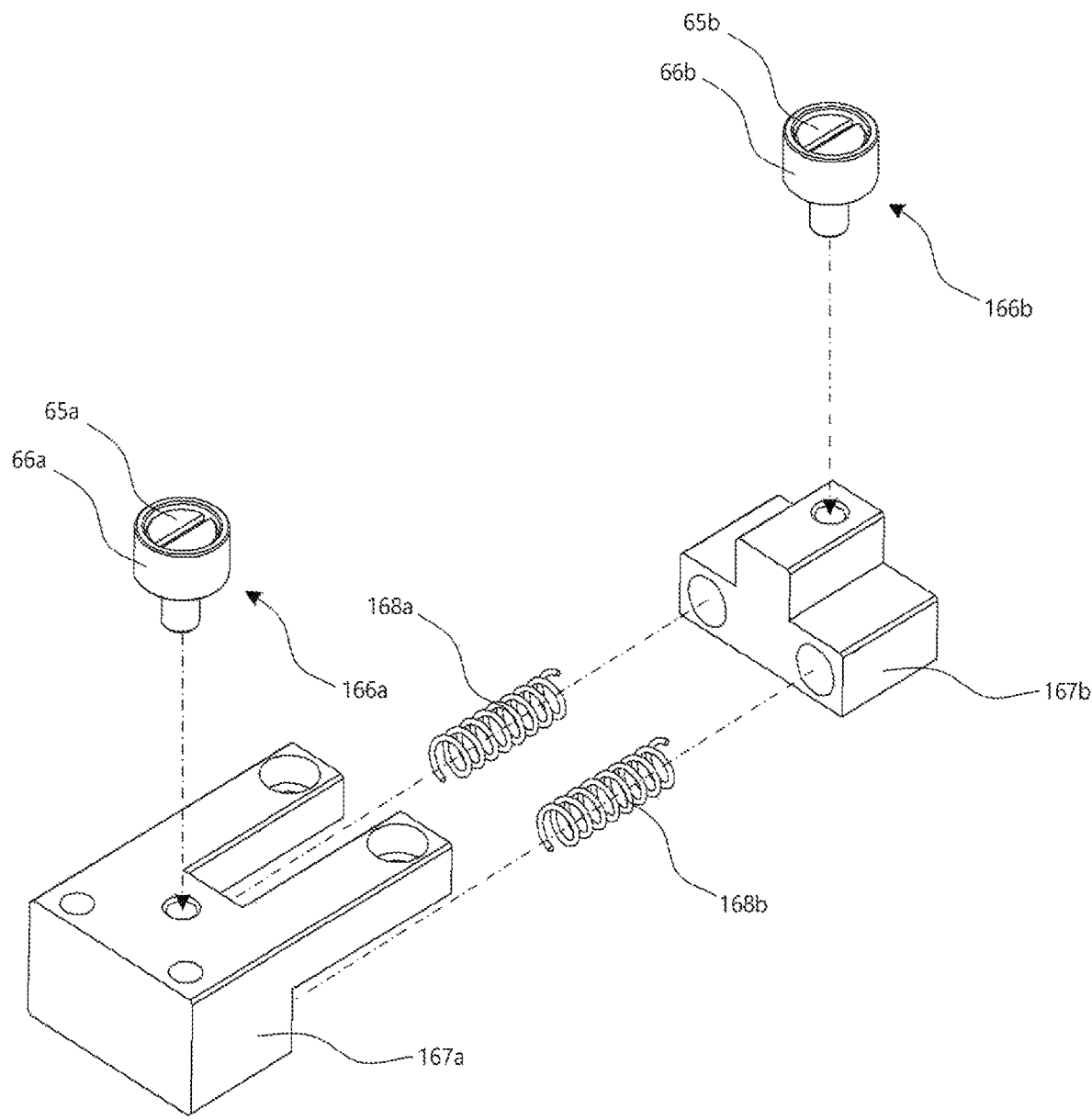
FIG. 8C is a perspective view of another pin block.

FIG. 8A is a perspective view showing the pin block 145 of FIG. 6A in more detail. FIG. 8B is an exploded perspective view of the pin block 145 of FIG. 6A. FIG. 8C is a perspective view of another pin block 165.

The pin block 145 of FIGS. 8A to 8B is fixed to the mounting pocket 144 of the first lens holder 140, and the pin block 165 of FIG. 8C is fixed to the mounting pocket 164 of the second lens holder 160.

Among them, the first pin block 145 may be composed of the protruding pins 146a and 146b, and a body portion 147 having the protruding pins 146a and 146b installed and fastened to the mounting pocket 144 of the first lens holder 140. Here, the pins 146a and 146b include rollers 46a and 46b capable of rotating within the first cam grooves 125a and 125b due to friction with the first cam grooves 125a and 125b, and bolts 45a and 45b fixing the rollers 46a and 46b to the body portion 147 of the pin block 145. Here, the rollers 46a and 46b are rotatable with respect to the bolts 45a and 45b based on an axis of the bolts 45a and 45b.

Specifically, the pin 146 may be composed of a first pin 146a and a second pin 146b, and the body portion 147 may be divided into a first body portion 147a on which the first pin 146a is installed and a second body portion 147b on which the second pin 146b is installed. Here, the bolts 45a and 45b may radial-inward fasten the body portion 147 to the mounting pocket 144. In addition, the first body portion 147a and the second body portion 147b are connected in the optical axis O direction by springs 148a and 148b, such that a distance between the first pin 146a and the second pin 146b may vary somewhat under a bias. The clearance between the first pin 146a and the second pin 146b helps to prevent resistance from increasing due to an assembly error when the user rotates the ring member 120 so that the pins 146a and 146b move along the first cam grooves 125a and 125b.

Although FIG. 8C is an exploded perspective view showing the second pin block 165, substantially, it differs from the first pin block 145 of FIG. 8B only in reference numerals of members, and the configuration may be substantially the same. Therefore, the second pin block 165 may be composed of protruding pins 166a and 166b, and the body portion 167 in which the protruding pins 166a and 166b are installed and fastened to the mounting pocket 164 of the second lens holder 160. Here, the pins 166a and 166b include rollers 66a and 66b capable of rotating in the second cam grooves 126a and 126b due to friction with the second cam grooves 126a and 126b, and bolts 65a and 65b fixing the rollers 66a and 66b to the body portion 167 of the pin block 165. Here, the rollers 66a and 66b are rotatable with respect to the bolts 65a and 65b based on an axis of the bolts 65a and 65b. Since the configuration and function of the second pin block 165 is the same as that of the first pin block 145, a duplicate description will be omitted.

Figure 9A:
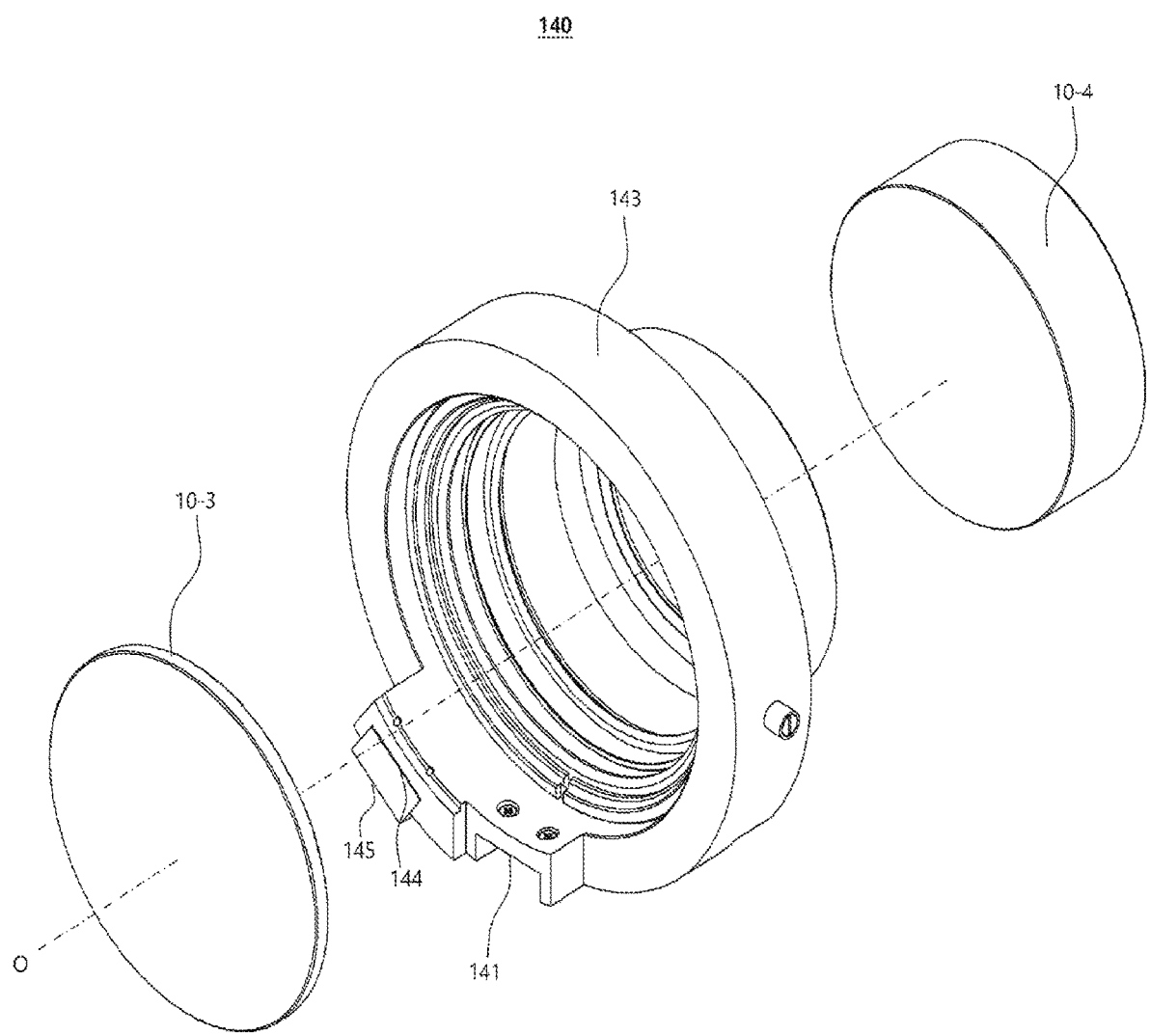
FIG. 9A is an exploded perspective view of the first lens holder.
Figure 9B:
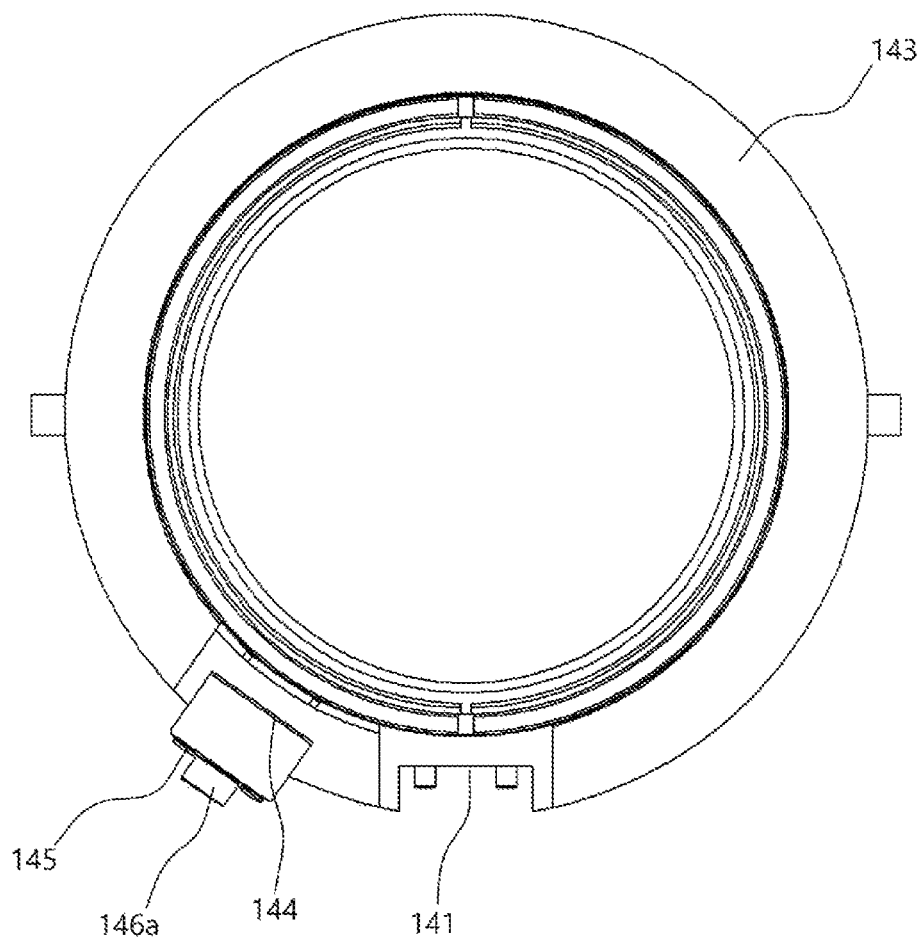
FIG. 9B is a front view of the first lens holder.
Figure 9C:
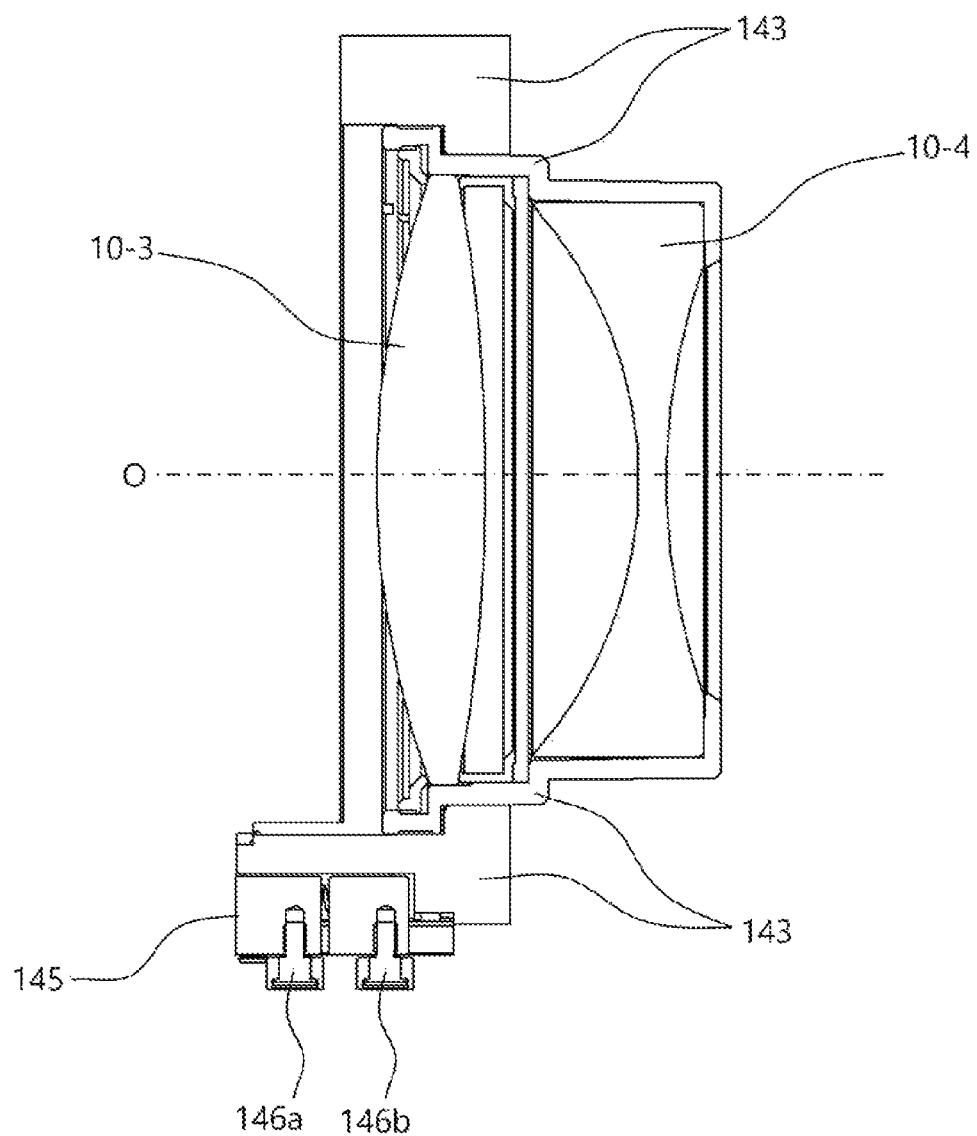
FIG. 9C is a side view of the first lens holder.

FIG. 9A is an exploded perspective view of the first lens holder 140. FIG. 9B is a front view of the first lens holder 140. FIG. 9C is a side view of the first lens holder 140.

A body portion 143 of the first lens holder 140 may accommodate at least one or more lenses 10-3 and 10-4 therein. The number and specific specifications of the lenses accommodated in the first lens holder 140 may be changed as much according to the intention of a designer. In addition, the mounting pockets 141 and 144 are provided on one side of an outer circumferential surface of the body portion 143. The first pin block 145 may be mounted on the mounting pocket 144, and the first carriage block 153-1 may be mounted on the mounting pocket 141.

Figure 10A:
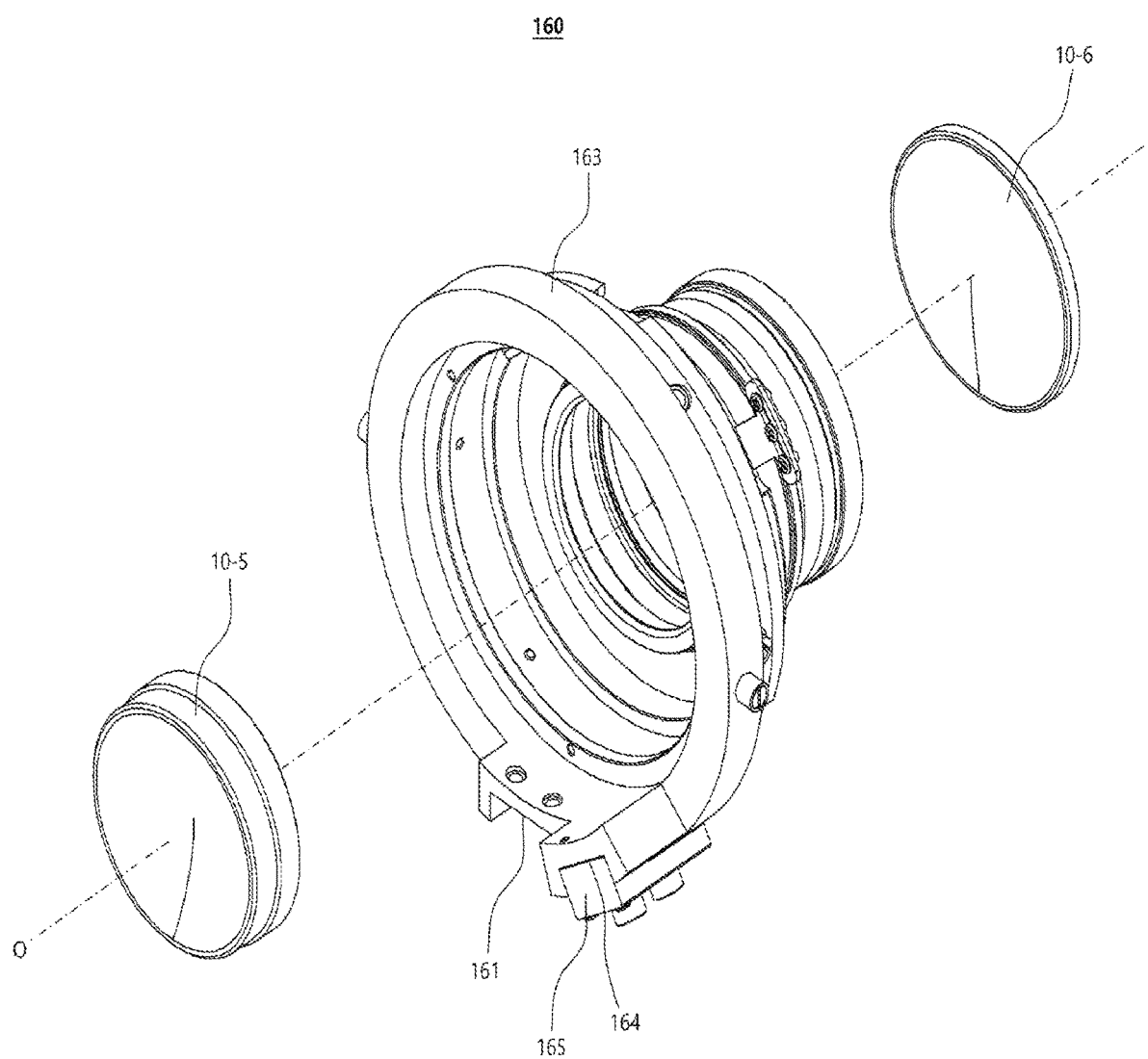
FIG. 10A is an exploded perspective view of the second lens holder.
Figure 10B:
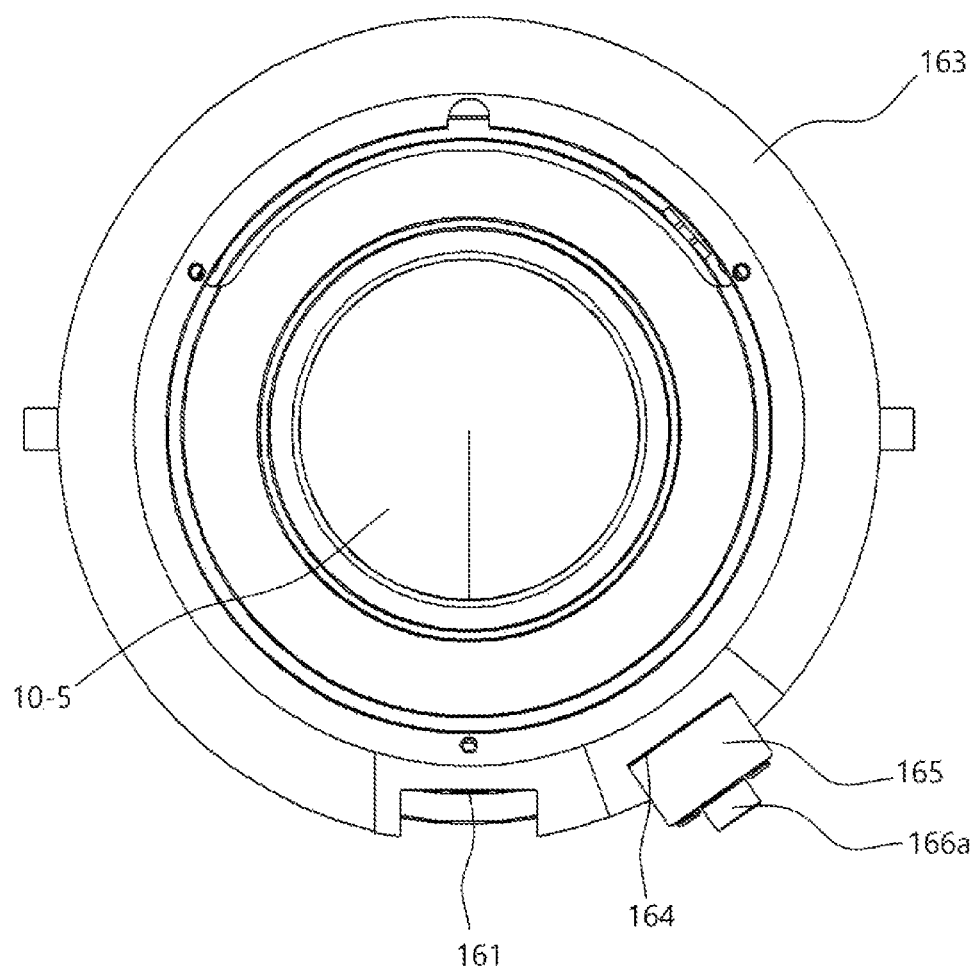
FIG. 10B is a front view of the second lens holder.
Figure 10C:
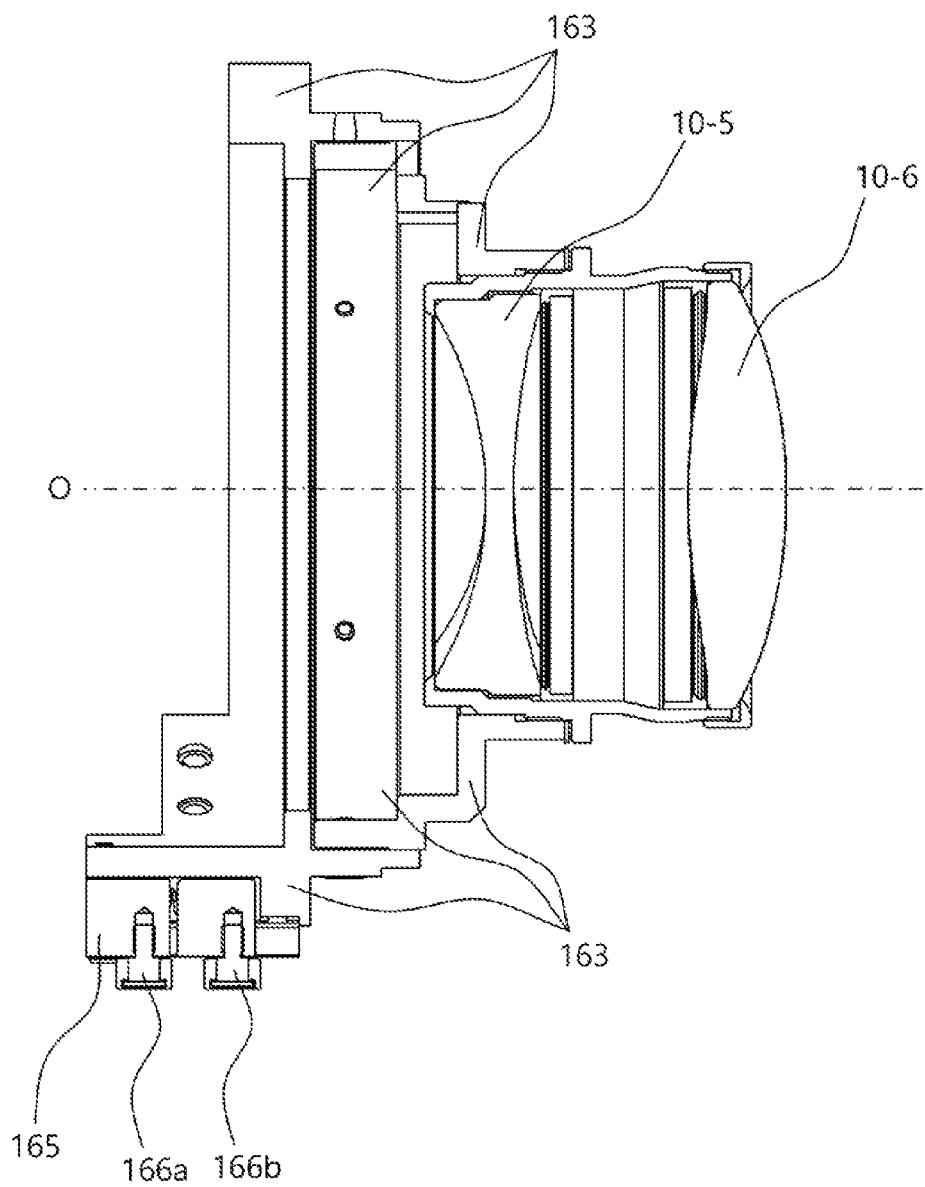
FIG. 10C is a side view of the second lens holder.

FIG. 10A is an exploded perspective view of the second lens holder 160. FIG. 10B is a front view of the second lens holder 160. FIG. 10C is a side view of the second lens holder 160.

A body portion 163 of the second lens holder 160 may accommodate at least one or more lenses 10-5 and 10-6 therein. The number and specific specifications of the lenses accommodated in the second lens holder 160 may be changed as much according to the intention of a designer. In addition, the mounting pockets 161 and 164 are provided on one side of an outer circumferential surface of the body portion 163. The second pin block 165 may be mounted on the mounting pocket 164, and the second carriage block 153-2 may be mounted on the mounting pocket 161.

Figure 11A:
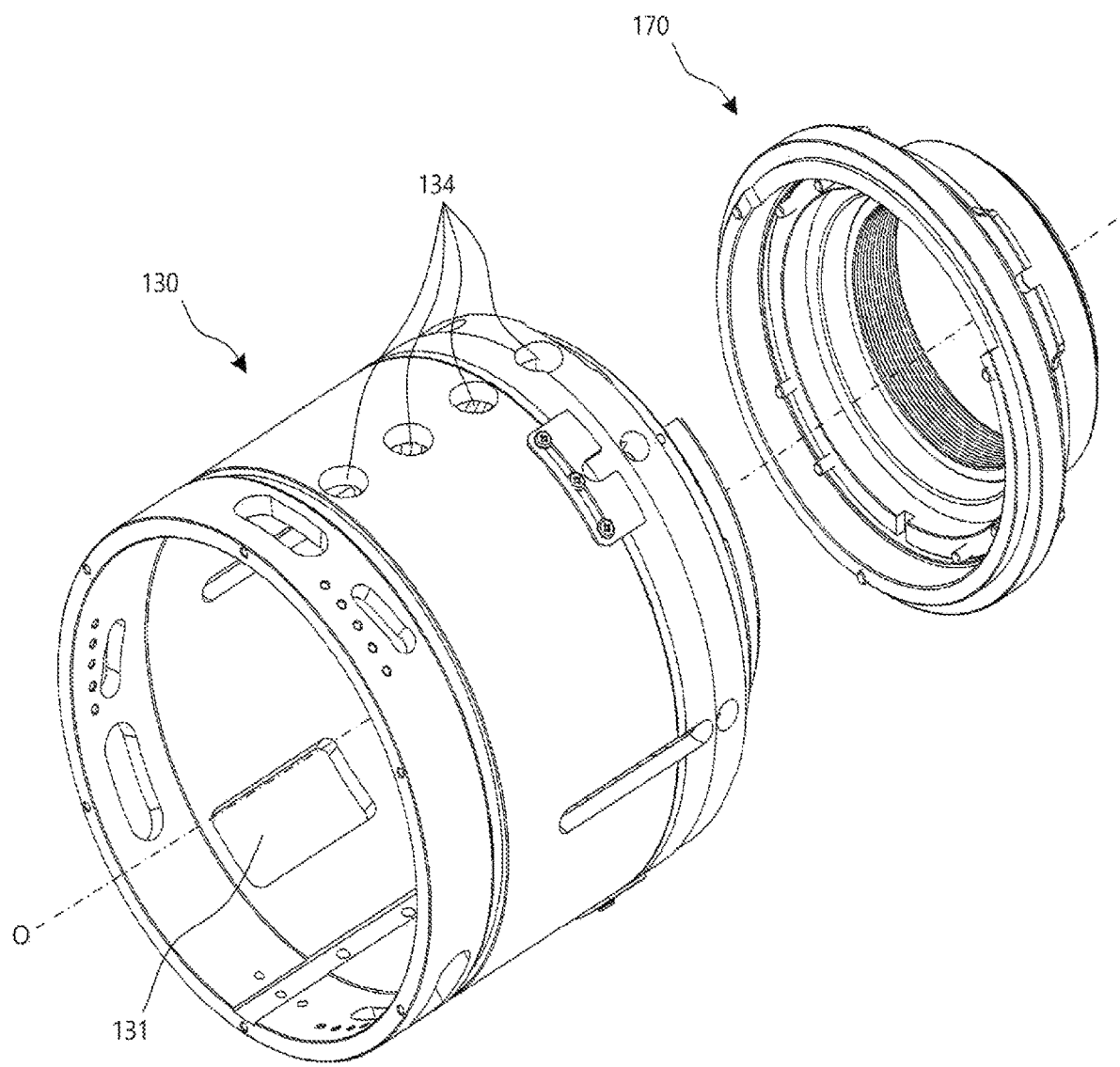
FIG. 11A is a perspective view showing a state in which the housing and the lens mount are separated.
Figure 11B:
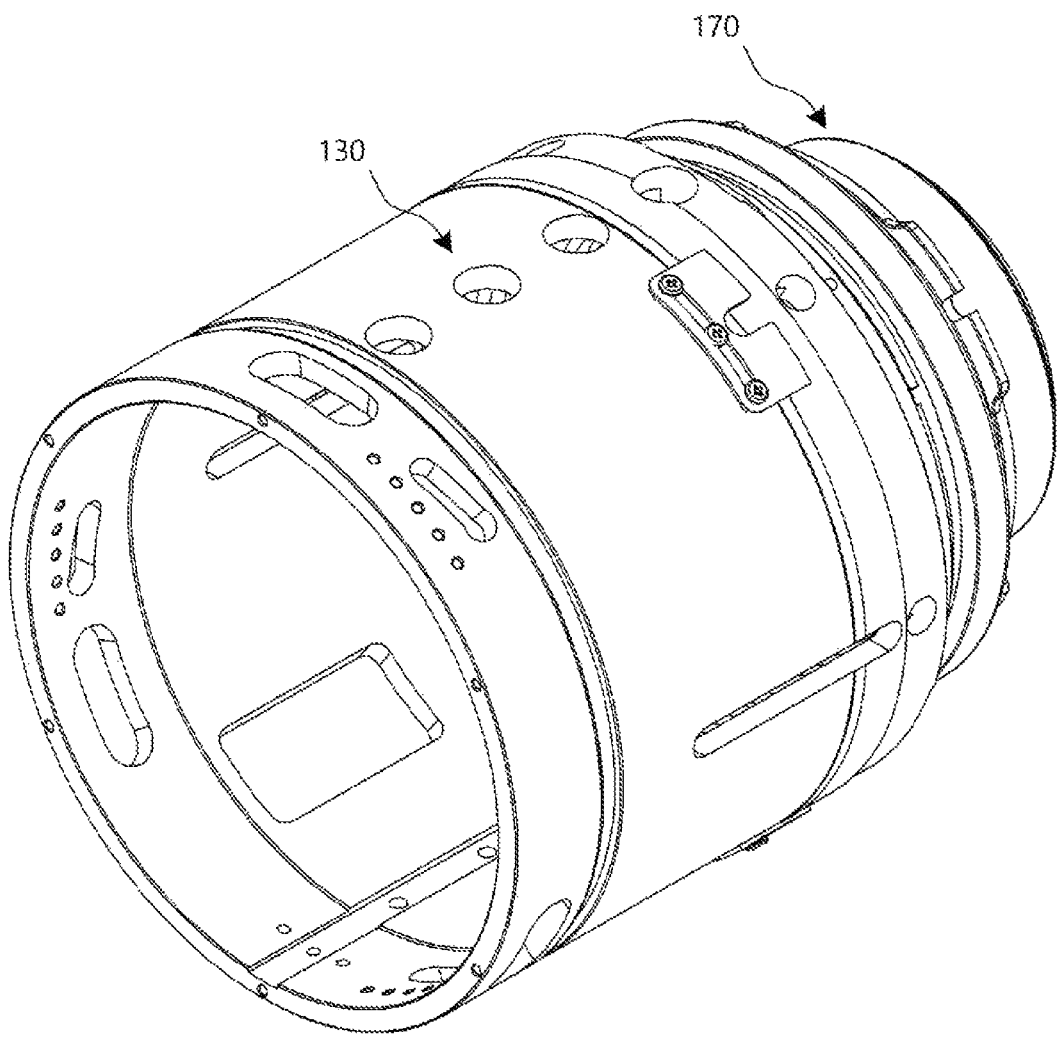
FIG. 11B is a perspective view showing a state in which the housing and the lens mount are coupled.
Figure 11C:
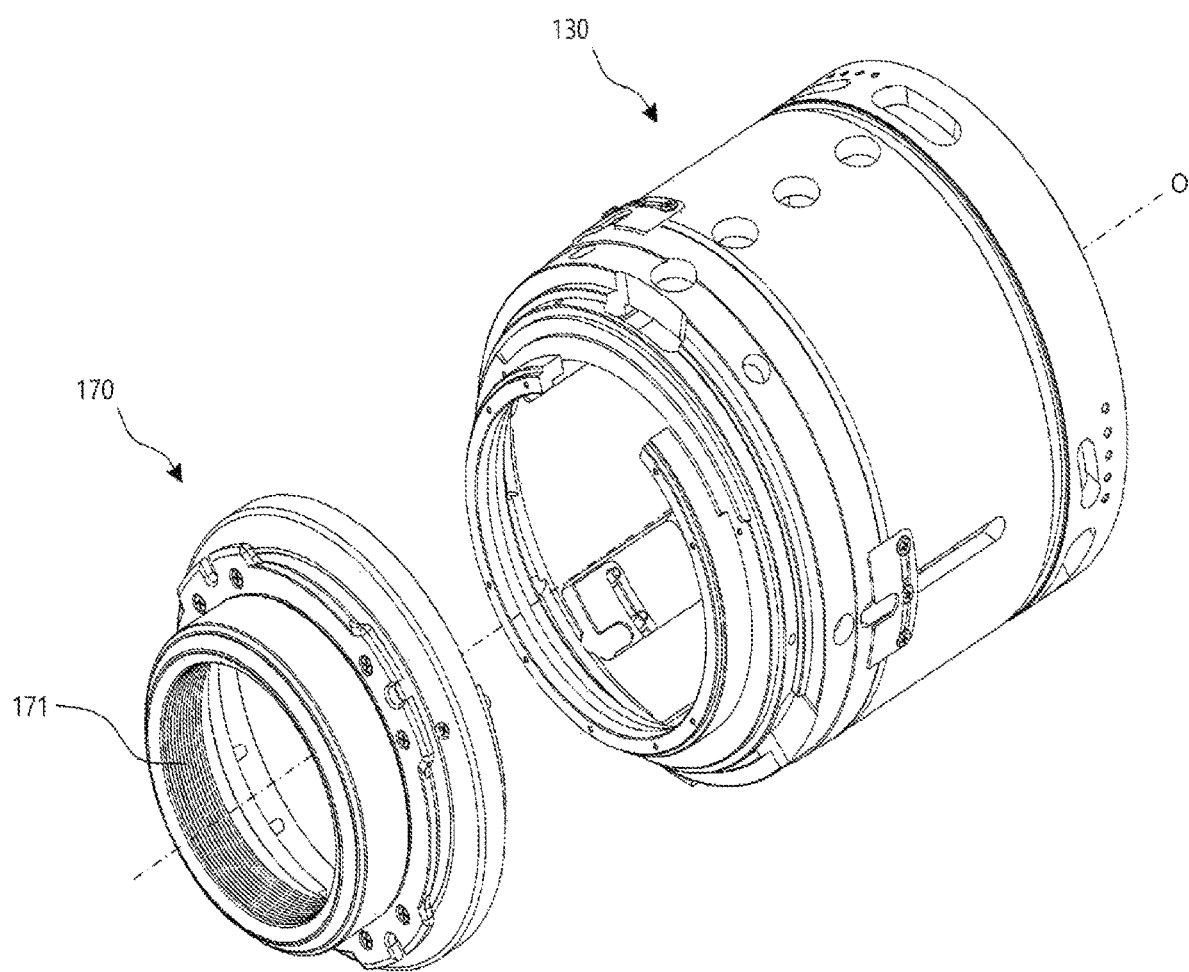
FIG. 11C is a perspective view of FIG. 11A viewed from the opposite direction.

FIG. 11A is a perspective view showing a state in which the housing 130 and the lens mount 170 are separated. FIG. 11B is a perspective view showing a state in which the housing 130 and the lens mount 170 are coupled. FIG. 11C is a perspective view of FIG. 11A viewed from the opposite direction.

An opening 131 is formed in the housing 130 so that the pins 146a, 146b, 166a, and 166b may radially penetrate the housing 130 and be coupled to the cam grooves 125a, 125b, 126a, and 126b of the ring member 120. In addition, the bolt hole 134 for mounting the guide rail 155 of the guide device 150 to the inner circumferential surface of the housing 130 is formed in the housing 130. The housing 130 may accommodate the fixed lens hold 110, the first lens holder 140, the second lens holder 160, and the guide device 150 therein, and may have the ring member 120 rotatable with respect to the housing 130 on its outer circumferential surface. In addition, the housing 130 may be assembled with the lens mount 170 in the optical axis O direction, and the lens mount 170 may be detachably assembled with the camera body 200 by forming a coupling screw 171 on an inner circumferential surface opposite to the optical axis O.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A camera lens assembly, comprising:
   a lens holder for accommodating at least one lens;
   a pin protruding from the lens holder in a radial direction of the at least one lens;
   a ring member with which the pin is engaged, the ring member having a cam groove formed in a spiral direction to have a predetermined pitch along an optical axis and being rotatable about the optical axis according to a user's operation;
   a guide device for guiding the lens holder to move only in a direction parallel to the optical axis,
   wherein when the ring member rotates, the lens holder on which the pin is formed moves in the direction parallel to the optical axis within the pitch under the guide of the guide device; and a housing for accommodating the lens holder and in which the guide device is installed, wherein the ring member is rotatably coupled to an outer diameter of the housing.

2. The assembly of claim 1, wherein the guide device comprise a guide rail fastened to one side of the housing, and a carriage block slidably coupled with the guide rail to move in the direction parallel to the optical axis, and
wherein the lens holder is fastened to the carriage block and moves along with the carriage block in a direction parallel to the optical axis.

3. The assembly of claim 2, wherein the guide rail is fastened to the housing by a bolt installed radial-outward, and
wherein the carriage block is fastened to the lens holder by other bolt installed radial-outward.

4. The assembly of claim 2, wherein the carriage block comprises a recess extending along a longitudinal direction of the guide rail,
wherein the guide rail comprises a guide that extends along the longitudinal direction of the guide rail and is engaged with the recess in the direction parallel to the optical axis, and
wherein the carriage block is slidably coupled to the guide rail by the engagement between the recess and the guide.

5. The assembly of claim 2, wherein the housing comprises an opening through which the pin passes through the housing in the radial direction and is coupled to the cam groove of the ring member.

6. The assembly of claim 2, wherein an angle at which the cam groove is formed in a circumferential direction of the ring member is greater than 180°, preferably 300° or more.

7. The assembly of claim 2, further comprising:
a pin block fixed to one side of the lens holder, the pin block comprising the protruding pin and a body portion on which the protruding pin is installed and fastened to a mounting pocket of the lens holder.

8. The assembly of claim 7, wherein the pin comprises: a roller capable of rotating within the cam groove due to friction with the cam groove; and a bolt for fixing the roller to the pin block, and
wherein the roller is rotatable with respect to the bolt about an axis of the bolt.

9. The assembly of claim 8, wherein the bolt radial-inward fastens the body portion to the mounting pocket.

10. The assembly of claim 7, wherein the pin comprises a first pin and a second pin, the body portion comprises a first body portion on which the first pin is installed and a second body portion on which the second pin is installed, and the first body portion and the second body portion are connected by a spring in the direction parallel to the optical axis,
such that an interval between the first pin and the second pin is variable under a bias.

11. The assembly of claim 2, wherein the lens holder comprises a first lens holder and a second lens holder,
wherein the pin comprises a first pin and a second pin,
wherein the cam groove comprises a first cam groove and a second cam groove, and the carriage block comprises a first carriage block and a second carriage block, and
wherein the first pin is installed on the first lens holder and engaged with the first cam groove, and the second pin is installed on the second lens holder and engaged with the second cam groove.

12. The assembly of claim 11, wherein the first cam groove and the second cam groove have different pitches, such that when the ring member rotates by the user's operation, a distance between the first lens installed on the first lens holder and the second lens installed on the second lens holder varies.

13. The assembly of claim 11, wherein each of the first cam groove and the second cam groove comprises two cam grooves parallel to each other.

14. The assembly of claim 12, wherein the at least one lens comprises a third lens fixed to the housing, together with the movable first lens and the movable second lens, and wherein the third lens is a lens closer to an image-side than the first and second lenses.

15. The assembly of claim 11, wherein the first pin block installed on the first lens holder and the second pin block installed on the second lens holder are positioned to be symmetrical in the circumferential direction based on the guide device.

16. The assembly of claim 15, wherein one end portion and the other end portion of the first cam groove are present in different positions from one end portion and the other end portion of the second cam groove, respectively, based on the circumferential direction, and
wherein an angle formed by the one end portion and the other end portion of the first cam groove in the circumferential direction and an angle formed by the one end portion and the other end portion of the second cam groove in the circumferential direction are equal to each other.

17. The assembly of claim 16, wherein the first cam groove and the second cam groove are formed on an inner circumferential surface of the ring member without passing through the ring member in the radial direction.

18. The assembly of claim 17, wherein through holes passing through the ring member in the radial direction are formed at the one end portion and the other end portion of the first cam groove and the one end portion and the other end portion of the second cam groove.

19. The assembly of claim 2, further comprising:
a lens mount coupled to the housing in the direction parallel to the optical axis, the lens mount being detachable from a camera body by forming a coupling screw on one side.

* * * * *